(12) United States Patent
Heyring et al.

(10) Patent No.: US 11,774,031 B2
(45) Date of Patent: Oct. 3, 2023

(54) STABILIZATION OF OBJECTS

(71) Applicant: No Rock Cafe Tables Pty Ltd, Eagle Bay (AU)

(72) Inventors: Toby William Heyring, Eagle Bay (AU); John Gerard Catoni, Dunsborough (AU)

(73) Assignee: No Rock Cafe Tables Pty Ltd, Eagle Bay (AU)

( * ) Notice: Subject to any disclaimer, the term of this patent is extended or adjusted under 35 U.S.C. 154(b) by 0 days.

(21) Appl. No.: 16/644,100

(22) PCT Filed: Sep. 4, 2018

(86) PCT No.: PCT/AU2018/050955
§ 371 (c)(1),
(2) Date: Mar. 3, 2020

(87) PCT Pub. No.: WO2019/041001
PCT Pub. Date: Mar. 7, 2019

(65) Prior Publication Data
US 2021/0062960 A1 Mar. 4, 2021

(30) Foreign Application Priority Data

Sep. 4, 2017 (AU) ................................ 2017903577
Jul. 1, 2018 (AU) ................................ 2018902385

(51) Int. Cl.
*F16M 11/06* (2006.01)
*A47B 13/08* (2006.01)

(52) U.S. Cl.
CPC ........... *F16M 11/06* (2013.01); *A47B 13/081* (2013.01); *F16M 2200/041* (2013.01)

(58) Field of Classification Search
CPC .................. F16M 11/06; F16M 2200/041; A47B 13/081; A47B 37/02; A47B 91/16
See application file for complete search history.

(56) References Cited

U.S. PATENT DOCUMENTS

| 467,811 A | * | 1/1892 | Humphreys | ........... A47B 91/16 248/188.3 |
| 3,117,392 A | | 1/1964 | JunKunc | |

(Continued)

FOREIGN PATENT DOCUMENTS

| FR | 1518712 A | 3/1968 | |
| FR | 2607878 A1 | * 6/1988 | ................ F16B 1/00 |

(Continued)

OTHER PUBLICATIONS

PCT Written Opinion for PCT/AU2018/050955 dated Oct. 29, 2018.

*Primary Examiner* — Christopher Garft
(74) *Attorney, Agent, or Firm* — Charles H Jew

(57) ABSTRACT

Stabilising arrangement (1) for supporting an object (4) has: first, second, third and fourth legs (5, 6, 7, 8) with respective ground engaging means and connected to interconnection means (2) by respective slide connections, the second and fourth ground engaging means on opposing sides of a virtual line between the first and third ground engaging means; a first balance beam (32) pivoted to the interconnection means and engaging with the first and second legs, the position of each leg determined by at least two additional constraints: i. a second balance beam (33) pivoted to the interconnection means and engaging with the second and third legs; ii. a third balance beam (34) pivoted to the interconnection means and engaging with the third and fourth legs; iii. a first leg fixing (46) connecting the first and third legs; and iv. a second leg fixing (47) connecting the second and fourth legs.

20 Claims, 16 Drawing Sheets

(56) References Cited

U.S. PATENT DOCUMENTS

| | | | | |
|---|---|---|---|---|
| 3,814,362 A | * | 6/1974 | Ritchie | A47B 13/023 248/188.3 |
| 3,855,947 A | * | 12/1974 | Henley | A47B 91/16 108/161 |
| 8,997,662 B2 | * | 4/2015 | Heyring | F16M 7/00 108/115 |
| 9,833,071 B2 | * | 12/2017 | Heyring | A47B 13/023 |
| 9,883,744 B2 | * | 2/2018 | Macyszyn | B62B 1/20 |
| 2013/0000529 A1 | * | 1/2013 | Heyring | A47B 91/16 108/147.22 |
| 2013/0036950 A1 | * | 2/2013 | Heyring | A47B 91/16 108/136 |
| 2015/0313358 A1 | * | 11/2015 | Heyring | A47B 13/021 248/188.2 |
| 2016/0270530 A1 | * | 9/2016 | Heyring | A61B 50/10 |
| 2016/0273701 A1 | * | 9/2016 | Heyring | A47B 13/023 |

FOREIGN PATENT DOCUMENTS

| | | | | |
|---|---|---|---|---|
| WO | 2000069312 A1 | | 11/2000 | |
| WO | WO-0069312 A1 | * | 11/2000 | D06F 39/125 |
| WO | 2011107677 A1 | | 9/2011 | |

* cited by examiner

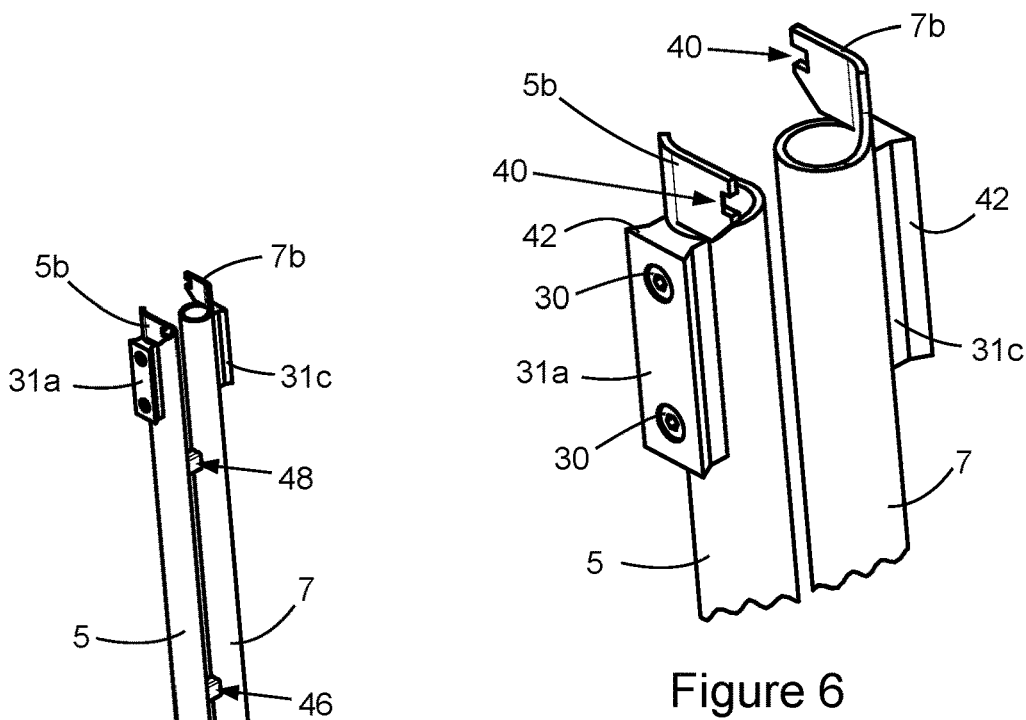
Figure 6
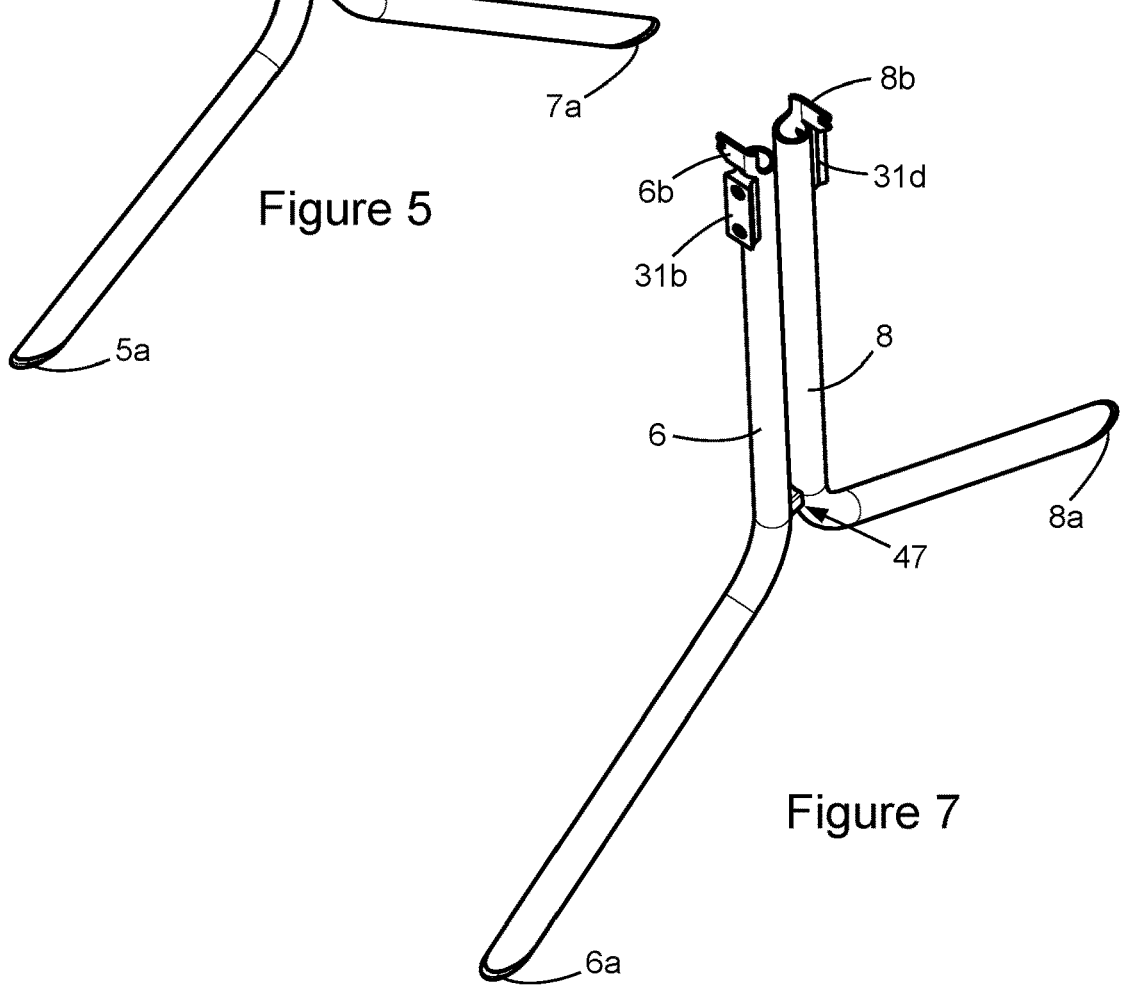
Figure 5
Figure 7

STABILIZATION OF OBJECTS

FIELD OF THE INVENTION

The present invention relates to the stabilisation of objects, such as free-standing furniture and appliances.

BACKGROUND OF THE INVENTION

Many objects such as items of furniture (i.e. tables, chairs and benches) and white goods are supported at at least four points of contact with the ground or floor (e.g. using ground engaging means such as legs, feet or wheels). These objects are used in a wide range of situations and in many cases the surface on which the object is stood is uneven or not a perfectly flat plane.

The use of at least four rigidly located ground contact points or feet, for example due to using four legs of equal length rigidly attached to and supporting a flat table top restricts the feet of the table to lie in a flat plane, so they are unable to all contact the ground simultaneously when the surface is uneven. This causes the table to be unstable and rock, which is most noticeable in four-legged tables with small table tops.

To prevent, for example, furniture from rocking on an uneven surface it is common for small tables or stools to use three fixed legs since three points are sufficient to define a linear plane and therefore provide location of the object without rocking.

Similarly, five fixed legs are typically used on wheeled office chairs to likelihood of significant rocking instability.

However, there are many reasons why three or five legs are undesirable on many objects, particularly those having a quadrilateral shape in plan view such as square or rectangular topped tables where four legs are generally preferred, located towards each corner.

SUMMARY OF INVENTION

According to a first aspect of the invention there is provided a stabilising arrangement for supporting an object, the stabilising arrangement including:
an interconnection means,
a first leg, a second leg, a third leg and a fourth leg, each of the first, second, third and fourth legs being slidably connected to the interconnection means by a respective slide connection, and each having a respective ground engaging means,
the ground engaging means of the second and fourth legs being on opposing sides of a virtual straight line extending between the ground engaging means of the first and third legs,
at least one balance beam, including a first balance beam pivotally connected directly or indirectly to the interconnection means and engaging in use with the first leg and engaging in use with the second leg;
the at least one balance beam and the first, second, third and fourth legs being arranged such that when the first leg moves in a first direction relative to the interconnection means the second leg moves in at least a second direction relative to the interconnection means, the second direction being an opposite direction relative to the first direction, and the third leg moves in the first direction and the fourth leg moves in at least the second direction.

According to a second aspect of the invention there is provided a stabilising arrangement for supporting an object, the stabilising arrangement including: an interconnection means; a first leg, a second leg, a third leg and a fourth leg, each of the first, second third and fourth legs slidably connected to the interconnection means by a respective (i.e. first, second, third or fourth) slide connection, and each having a respective ground engaging means; the ground engaging means of the second and fourth legs being on opposing sides of a virtual straight line extending between the ground engaging means of the first and third legs; a first balance beam pivotally connected directly or indirectly to the interconnection means at a first pivot and engaging in use with the first leg and engaging in use with the second leg; a respective position of each of the respective legs being determined by at least one of the following sets of additional constraints:

a) a second and a third balance beam, the second balance beam pivotally connected directly or indirectly to the interconnection means at a second pivot and engaging in use with the second leg and engaging in use with the third leg, and the third balance beam pivotally connected directly or indirectly to the interconnection means at a third pivot and engaging in use with the third leg and engaging in use with the fourth leg; or b) a second balance beam and a second leg fixing, the second balance beam pivotally connected directly or indirectly to the interconnection means at a second pivot and engaging in use with the second leg and engaging in use with the third leg, and the second leg fixing providing a fixing of the second leg to the fourth leg; or c) a third balance beam and a first leg fixing, the third balance beam pivotally connected directly or indirectly to the interconnection means at a third pivot and engaging in use with the third leg and engaging in use with the fourth leg, and the first leg fixing providing a fixing of the first leg to the third leg; or d) a first leg fixing and a second leg fixing, the first leg fixing providing a fixing of the first leg to the third leg, and the second leg fixing providing a fixing of the second leg to the fourth leg.

This arrangement may provide that when the first leg moves in a first direction relative to the interconnection means the second leg moves in a second direction relative to the interconnection means, the second direction being opposite to the first direction, and the third leg moves in the first direction and the fourth leg moves in the second direction.

In this stabilising arrangement, the ground engaging means may maintain contact with the ground when the ground is flat or warped, at least up to a limit of travel of the arrangement. The first and third legs may be diagonally opposite each other, and the second and fourth legs may be diagonally opposite each other, but the first, second, third and fourth legs may not necessarily be arranged in a square configuration.

The object may be supported by or connected directly or indirectly to the interconnection means. The object may be a table top.

The stabilising arrangement may further include an additional constraint of a fourth balance beam pivotally connected directly or indirectly to the interconnection means at a fourth pivot and engaging in use with the fourth leg and the first leg.

Each slide connection may permit linear sliding of the respective leg relative to the interconnection means. The linear sliding of the respective leg may be in a substantially vertical direction relative to the interconnection means or in a direction that is perpendicular to an average ground plane.

A frictional force in at least one of the slide connections may increase when an eccentric load is applied to the stabilising arrangement.

The first balance beam may engage, in use, at a first engagement region with the first leg and may engage, in use, at a second engagement region with the second leg, the first engagement region being on the opposite side of the first pivot to the second engagement region, when viewed in plan view for example.

When the additional constraints include the second balance beam, the second balance beam may engage, in use, at a first engagement region with the second leg and may engage, in use, at a second engagement region with the third leg, the first engagement region being on the opposite side of the first pivot to the second engagement region, when viewed in plan view for example.

When the additional constraints include the third balance beam, the third balance beam may engage, in use, at a first engagement region with the third leg and may engage, in use, at a second engagement region with the fourth leg, the first engagement region being on the opposite side of the first pivot to the second engagement region, when viewed in plan view.

When the additional constraints include the first leg fixing, the first leg may be fixed to the third leg by a first lower brace. The first leg may be further fixed to the third leg by a first upper brace or by an upper extension to the first lower brace. Additionally when the additional constraints further include the second leg fixing, the second leg may be fixed to the fourth leg by a second lower brace. The second leg may be further fixed to the fourth leg by a second upper brace, at least one of the first or second upper or lower braces being removable.

Alternatively, when the additional constraints include the second leg fixing, the second leg may be fixed to the fourth leg by a second lower brace. The second leg may be further fixed to the fourth leg by a second upper brace or an upper extension to the second lower brace.

Another aspect of the present invention provides a stabilising arrangement for supporting an object, the stabilising arrangement including: an interconnection means; a first leg, a second leg, a third leg and a fourth leg, each of the first, second third and fourth legs slidably connected to the interconnection means by a respective (i.e. first, second, third or fourth) slide connection, and each having a respective ground engaging means, the ground engaging means of the second and fourth legs being on opposing sides of a virtual line drawn between the ground engaging means of the first and third legs; at least one balance beam, including a first balance beam pivotally connected directly or indirectly to the interconnection means and engaging in use with the first leg and engaging in use with the second leg; the at least one balance beam and the legs being arranged such that when the first leg moves in a first direction relative to the interconnection means the second leg moves in a second direction relative to the interconnection means, the second direction being opposite to the first direction, and the third leg moves in the first direction and the fourth leg moves in the second direction.

Another aspect of the present invention provides a stabilising arrangement for supporting an object, the stabilising arrangement including: an interconnection means; a first leg, a second leg, a third leg and a fourth leg, each slidably connected to the interconnection means by a respective slide connection, and each having a respective ground engaging means; the ground engaging means of the second and fourth legs being on opposing sides of a virtual line drawn between the ground engaging means of the first and third legs; at least a first balance beam, a second balance beam and a third balance beam: the first balance beam pivotally connected directly or indirectly to the interconnection means at a first pivot and engaging in use with the first leg and engaging in use with the second leg; the second balance beam pivotally connected directly or indirectly to the interconnection means at a second pivot and engaging in use with the second leg and engaging in use with the third leg; the third balance beam pivotally connected directly or indirectly to the interconnection means at a third pivot and engaging in use with the third leg and engaging in use with the fourth leg.

Another aspect of the present invention provides a stabilising arrangement for supporting an object, the stabilising arrangement including: an interconnection means; a first leg, a second leg, a third leg and a fourth leg, each slidably connected to the interconnection means by a respective slide connection, and each having a respective ground engaging means; the ground engaging means of the second and fourth legs being on opposing sides of a virtual line drawn between the ground engaging means of the first and third legs; at least a first balance beam, a second balance beam and a second leg fixing: the first balance beam pivotally connected directly or indirectly to the interconnection means at a first pivot and engaging in use with the first leg and engaging in use with the second leg; the second balance beam pivotally connected directly or indirectly to the interconnection means at a second pivot and engaging in use with the second leg and engaging in use with the third leg; the second leg fixing providing a fixing of the second leg to the fourth leg.

Another aspect of the present invention provides a stabilising arrangement for supporting an object, the stabilising arrangement including: an interconnection means; a first leg, a second leg, a third leg and a fourth leg, each slidably connected to the interconnection means by a respective slide connection, and each having a respective ground engaging means; the ground engaging means of the second and fourth legs being on opposing sides of a virtual line drawn between the ground engaging means of the first and third legs; at least a first balance beam, a third balance beam and a first leg fixing: the first balance beam pivotally connected directly or indirectly to the interconnection means at a first pivot and engaging in use with the first leg and engaging in use with the second leg; the third balance beam pivotally connected directly or indirectly to the interconnection means at a third pivot and engaging in use with the third leg and engaging in use with the fourth leg; the first leg fixing providing a fixing of the first leg to the third leg.

Another aspect of the present invention provides a stabilising arrangement for supporting an object, the stabilising arrangement including: an interconnection means; a first leg, a second leg, a third leg and a fourth leg, each slidably connected to the interconnection means by a respective slide connection, and each having a respective ground engaging means; the ground engaging means of the second and fourth legs being on opposing sides of a virtual line drawn between the ground engaging means of the first and third legs; at least a first balance beam, a first leg fixing and a second leg fixing: the first balance beam pivotally connected directly or indirectly to the interconnection means at a first pivot and engaging in use with the first leg and engaging in use with the second leg; the first leg fixing providing a fixing of the first leg to the third leg; the second leg fixing providing a fixing of the second leg to the fourth leg.

Another aspect of the present invention provides a stabilising arrangement for supporting an object, the stabilising arrangement including: an interconnection means including first, second, third and fourth fixed leg portions; a first movable leg, a second movable leg, a third movable leg and a fourth movable leg, each of the first, second third and fourth movable legs being slidably connected to the respective fixed leg portion of the interconnection means, and each movable leg having a respective ground engaging means and first and second lever contact regions; the ground engaging means of the second and fourth movable legs being on opposing sides of a virtual line drawn between the ground engaging means of the first and third movable legs; at least three balance beams including a first balance beam, a second balance beam, and a third balance beam: each respective first, second or third balance beam being pivotally connected to the interconnection means at a respective first, second or third pivot having a respective pivot axis; each balance beam including a first engagement region and a second engagement region, the respective first, second or third pivot being between the first and second engagement regions of the respective first, second or third balance beam; the first engagement region of each respective balance beam being, in use, in contact with the first lever contact region of the respective movable leg; the second engagement region of the respective first, second or third balance beam being, in use, in contact with the second lever contact region of the second, third or fourth movable leg respectively.

This arrangement may provide that when the first leg moves in a first direction relative to the interconnection means the second leg moves in a second direction relative to the interconnection means, the second direction being opposite to the first direction, and the third leg moves in the first direction and the fourth leg moves in the second direction.

In this stabilising arrangement, the ground engaging means may maintain contact with the ground when the ground is flat or warped, at least up to a limit of travel of the arrangement. The first and third legs may be diagonally opposite each other, and the second and fourth legs may be diagonally opposite each other, but the first, second, third and fourth legs may not necessarily be arranged in a square configuration.

The object may be supported by or connected directly or indirectly to the interconnection means. The object may be a table top.

Each fixed leg portion may include a respective guide block.

The at least three balance beams may include a fourth balance beam having first and second engagement regions and being pivotally connected directly or indirectly to the interconnection means at a fourth pivot having a fourth pivot axis between the first and second engagement regions; the first engagement region, in use, being in contact with the first lever contact region of the fourth movable leg and the second engagement region, in use, being in contact with the second lever contact region of the first movable leg. The first pivot axis may be substantially aligned with the third pivot axis and the second pivot axis may be substantially aligned with the fourth pivot axis.

The respective movable leg may be substantially located around the outside of the respective fixed leg portion. Alternatively or additionally, each movable leg may include a respective top cap connected to an upper end of the respective movable leg. Each top cap may include an upper guide, each upper guide including inner guide surfaces to guide the respective movable leg around the respective fixed leg portion. Alternatively or additionally, each top cap may include a respective lever connector, each lever connector including the first lever contact region and the second lever contact region of the respective movable leg.

Each fixed leg portion may include a respective lower guide block, each lower guide block being connected to a lower end of the respective fixed leg portion and including outer lower guide surfaces protruding wider than the fixed leg portion to guide the respective movable leg, for example to assist the moveable leg to maintain alignment with the fixed leg portion.

Alternatively, the respective moveable leg may be located substantially inside the respective fixed leg portion.

The interconnection means may further include lever guides for each balance beam. The lever guides for a respective balance beam may include two substantially parallel plates, one on either side of the respective balance beam, such that bending of the balance beams is restricted. For example, each lever guide can be a U-section of material forming at least a portion of a side of the interconnection means and including the respective pivot. Alternatively or additionally, the lever guides may be brackets attached to or forming part of either: a main body of the interconnection means; or the fixed leg portions, such that bending of the balance beams is restricted.

Each fixed leg portion may include a respective lower guide block, each lower guide block being connected to a lower end of the respective fixed leg portion and including at least one inner guide surface to guide the respective moveable leg, for example to assist the moveable leg to maintain alignment with the fixed leg portion.

It will be convenient to further describe the invention by reference to the accompanying drawings which illustrate preferred aspects of the invention. Other embodiments of the invention are possible and consequently particularity of the accompanying drawings is not to be understood as superseding the generality of the preceding description of the invention.

BRIEF DESCRIPTION OF THE DRAWINGS

In the drawings:

FIG. 5 is a perspective view of a pair of legs of the stabilising arrangement of FIG. 1.

FIG. 6 is detail view of the top of the pair of legs of FIG. 5.

FIG. 7 is a perspective view of a second pair of legs of the stabilising arrangement of FIG. 1.

DESCRIPTION OF PREFERRED EMBODIMENT

Figure 1:
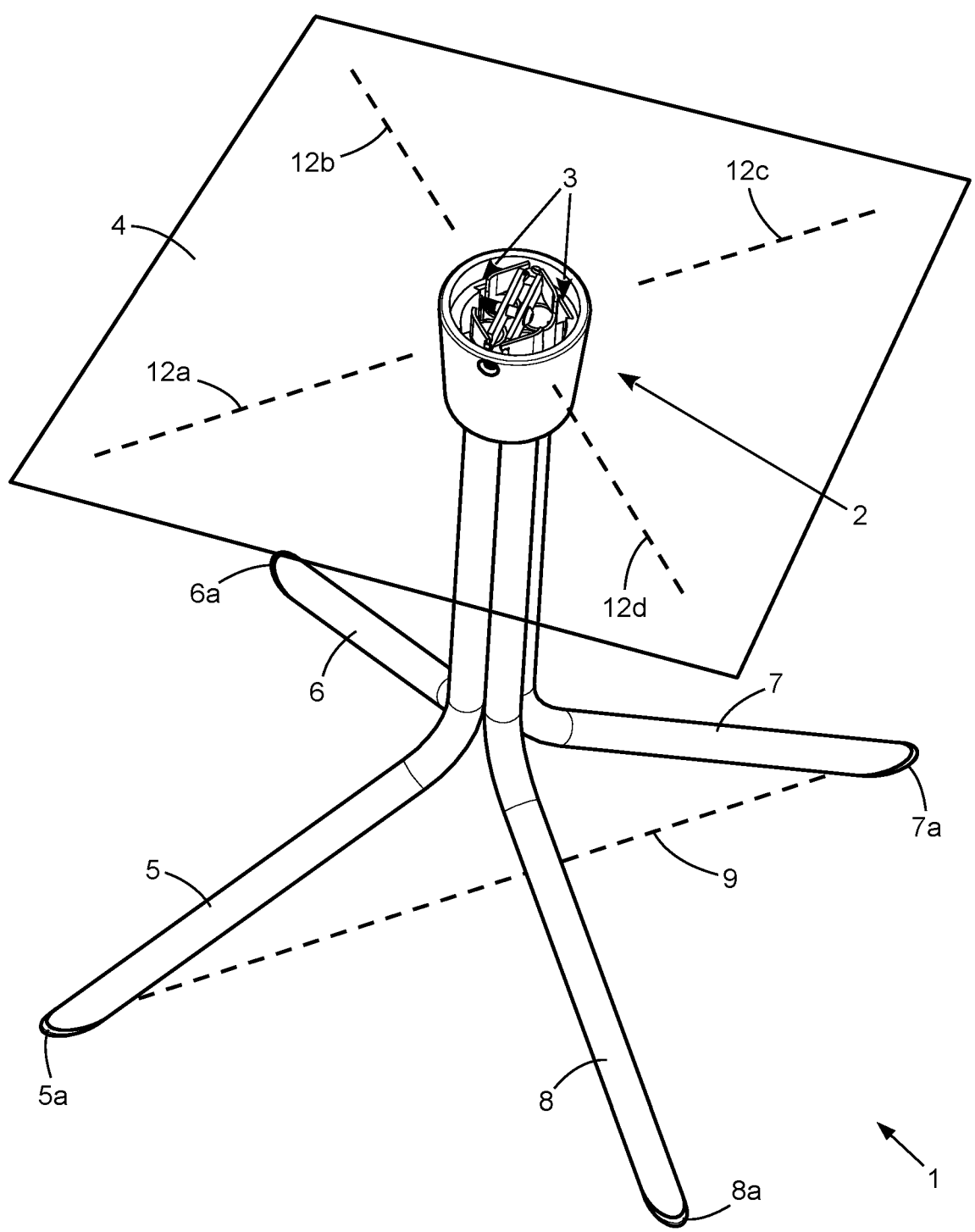
FIG. 1 is a perspective view of a stabilising arrangement supporting an object according to the present invention.
Figure 2:
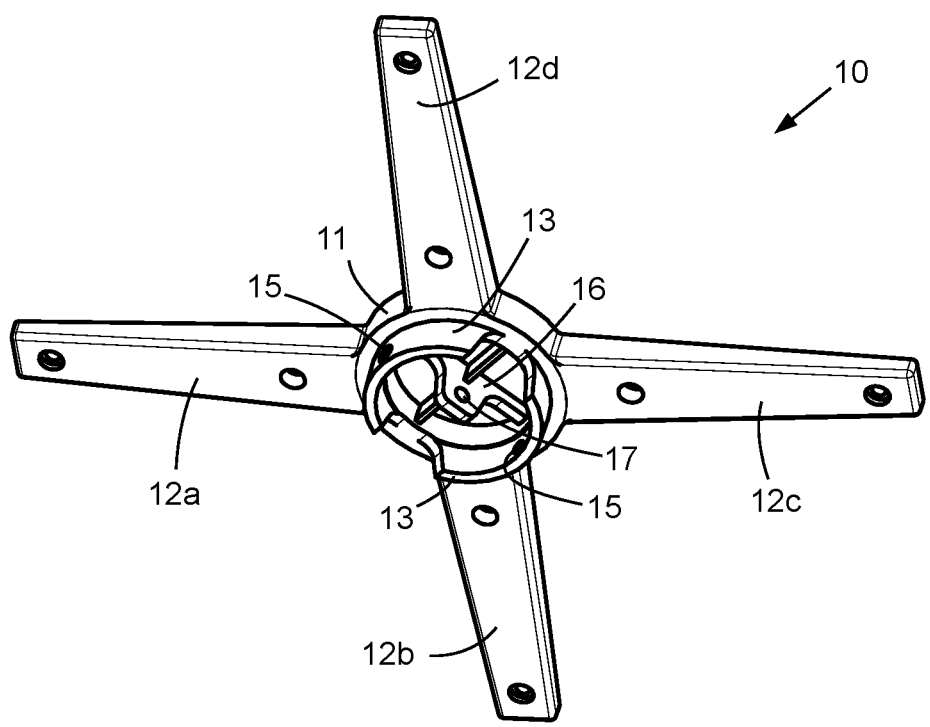
FIG. 2 is a perspective view of a part for the stabilising arrangement of FIG. 1.

Referring initially to FIG. 1, there is shown a stabilising arrangement 1 supporting an object, being in this example a table top 4. The table top shown as transparent to enable the interconnection means 2 to be seen, part of which, the spider 10 shown in FIG. 2 is indicated in FIG. 1 only by the arms 12a, 12b, 12c, 12d, shown in dashed lines. In the Figures, like features are allocated the same reference numeral.

The stabilising arrangement has four legs, 5, 6, 7, 8, each having a corresponding ground engaging means such as a foot 5a, 6a, 7a, 8a which in use contacts the ground. The legs 5, 6, 7, 8 are able to slide (preferably vertically) relative to the interconnection means 2 at respective slide connections 3 such that the stabilising arrangement confirms to uneven surfaces (i.e. where the ground engaging means 5a, 6a, 7a, 8a do not lie in a common plane), without any user input. A virtual line 9 is shown between the foot 5a of the first leg 5 and the foot 7a of the third leg 7. The foot 6a of the second leg 6 is located on the opposite side of the virtual line 9 to the foot 8a of the fourth leg 8.

The spider 10 shown in FIG. 2 comprises a hub 11 from which four arms 12a, 12b, 12c, 12d radiate to support an object such as a table top. In this example, the spider includes additional features not usually present in a conventional spider. These additional features are located under the hub 11 and are a necessary part of the interconnection means 2. Such features can be provided in a cap to which, for example, a conventional spider is then fitted. These additional features include a circular wall 13 to mate with a recess 23 in the slider guide 20 of the interconnection means shown in FIG. 3. At least one hole 15 is provided in the wall 13 to enable the spider 10 of FIG. 2 to aligned with a corresponding hole 22 in the slider guide 20 of FIG. 3 to enable the spider to be held in a correct orientation relative to the slider guide. Also a balance beam pivot hole 17 is shown in plate 16 formed under the hub 11 of the spider in FIG. 2.

Figure 3:
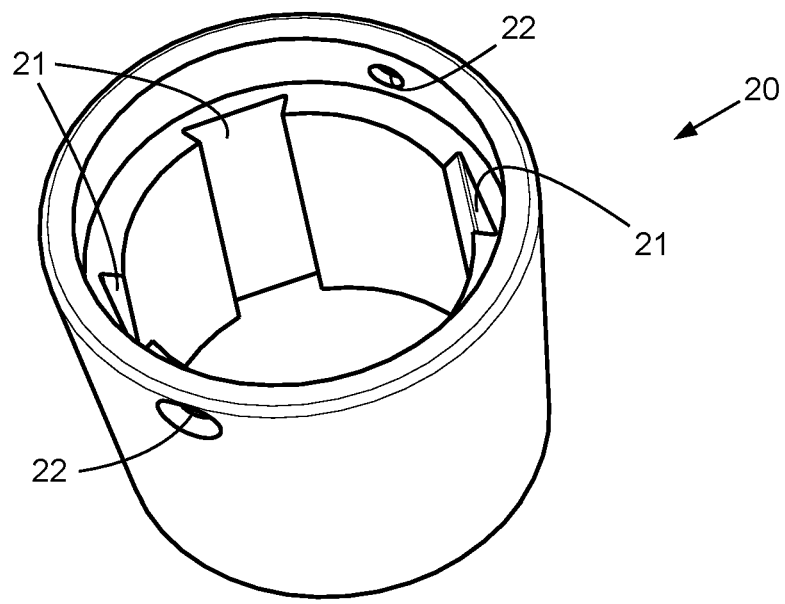
FIG. 3 is a perspective view of a part of the stabilising arrangement of FIG. 1.
Figure 4:
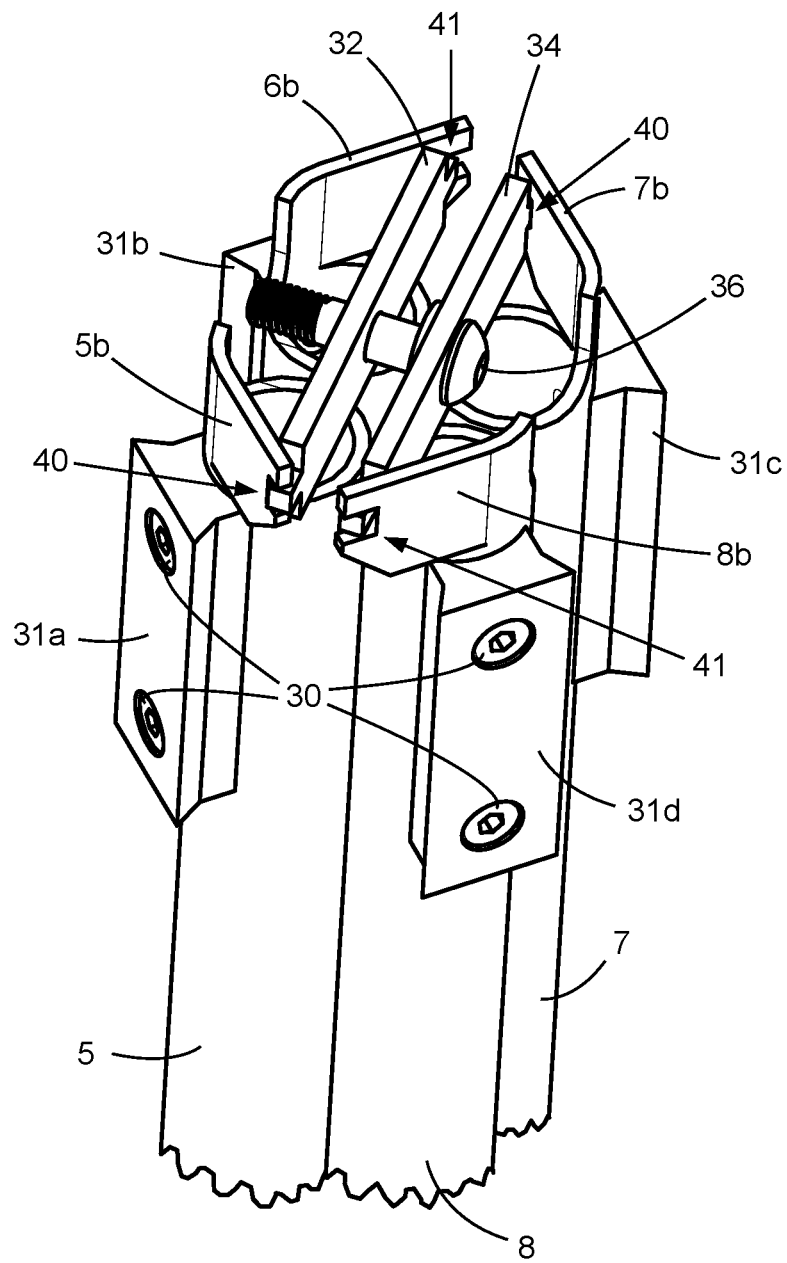
FIG. 4 is perspective view of a detail of the stabilising arrangement of FIG. 1.

The slider guide 20 shown in FIG. 3 also forms part of the interconnection means 2. The slider guide 20 also includes four slots 21 (three of which are visible in FIG. 3), one for each of the legs of the stabilising arrangement. FIG. 4 shows the stabilising arrangement in the region of the tops of the legs with the interconnection means (slider guide and spider) omitted for clarity. To each of the legs 5, 6, 7, 8, is fixed a respective slider block 31a, 31b, 31c, 31d (collectively slider blocks 31) shaped to slide within the slots 21 of the slider guide shown in FIG. 3. The slots 21 of the slider guide 20 of FIG. 3 together with the slider blocks 31a, 31b, 31c, 31d of FIG. 4 together form respective first, second, third and fourth slide connections 3 for the respective legs 5, 6, 7, 8. In this way, each leg is constrained such that substantially only linear sliding motions are possible between the legs and the interconnection means. Each slider block is fixed to the leg by any known means such as welding, bonding or as shown, bolting using bolts 30.

When the stabilising arrangement is on flat and level ground the linear direction in which the legs can slide relative to each other and the interconnection means is preferably vertical, but can be angled from the vertical, although preferably by less than 30 degrees and more preferably less than 20 degrees and yet more preferably less than 10 degrees. Alternatively, the slider blocks and the slots in the slider guides can be curved so the sliding motions do not have to be limited to linear motions.

As shown in FIG. 4, the top of each hollow tube leg 5, 6, 7, 8 is cut and straightened out to form a respective tab 5b, 6b, 7b, 8b. In the end of each tab is a slot. Balance beams 32 and 34 act on each leg in its respective slot. The balance beams 32 and 34 pivot on bolt 36, which when assembled, passes through the hole 17 in the spider to therefore fix the pivot axis of the balance beams 32, 34 relative to the interconnection means. One end of the first balance beam 32 engages with the slot in the tab 5b in the first engaging region 40 on the first leg 5. The opposite end of the first balance beam 32 engages with the slot in the tab 6b in the second engaging region 41 on the second leg 6. Similarly, one end of the second balance beam 34 engages with the slot in the tab 7b in the first engaging region 40 on the third leg 7 and the opposite end of the second balance beam 34 engages with the slot in the tab 8b in the second engaging region 41 on the fourth leg 8. Thus as the first leg 5 moves upwards relative to the interconnection means 2 in FIG. 1, the balance beam 32 rotates about bolt 36 and the second leg 6 moves downwards. Similarly the balance beam 34 ensures that the third and fourth legs 7, 8 move in opposite directions to each other.

The first and third legs 5 and 7 are preferably fixed to each other by a first leg fixing which can be a mechanical fastener such as a rivet, screw or bolt, or by a bonding agent or by welding or brazing for example. The first leg fixing shown in FIG. 5 is a brace 46. Similarly, as shown in FIG. 6, the second the fourth legs 6 and 8 are preferably fixed to each other using a second leg fixing, shown in FIG. 8 as a similar brace 47 offset vertically from the brace 46 to permit relative vertical motion of the first and third legs relative to the second and fourth legs. The tops of the first and third legs 5 and 7 are shown in detail in FIG. 6, including the slots forming the first engaging regions 40. The slots in the second and fourth legs form the second engaging regions. Also the shape of the slider blocks 31a, 31c in this example can be seen, each flaring into a wider portion 42 towards the outer region to engage with the guide slots of the slider guides of the interconnection means.

When the first and third legs are fixed to each other by a first leg fixing such as by the first lower brace 46 and when a similar second leg fixing such as the lower brace 47 is provided between the second the fourth legs (at a vertical offset as discussed), then preferably an additional or upper leg fixing such as the upper brace 48 in FIG. 5 is provided between the pair of legs with the uppermost lower leg fixing so that the two pairs of legs can still be assembled together. The benefit of providing an upper brace or simply extending the uppermost lower brace a significant distance towards the tops of the legs can be improved rigidity and therefore stability. Upper and lower braces can be provided on both pairs of legs, but at least one of the braces must be removable (such as bolted in place as opposed to being permanently fixed by weld or glue for example) to permit assembly.

It should be noted that when both pairs of legs are braced together, i.e. when there is a first leg fixing and a second leg fixing, then only one balance beam is required between two adjacent legs, such as the first balance beam 32 between the first and second legs.

Figure 8:
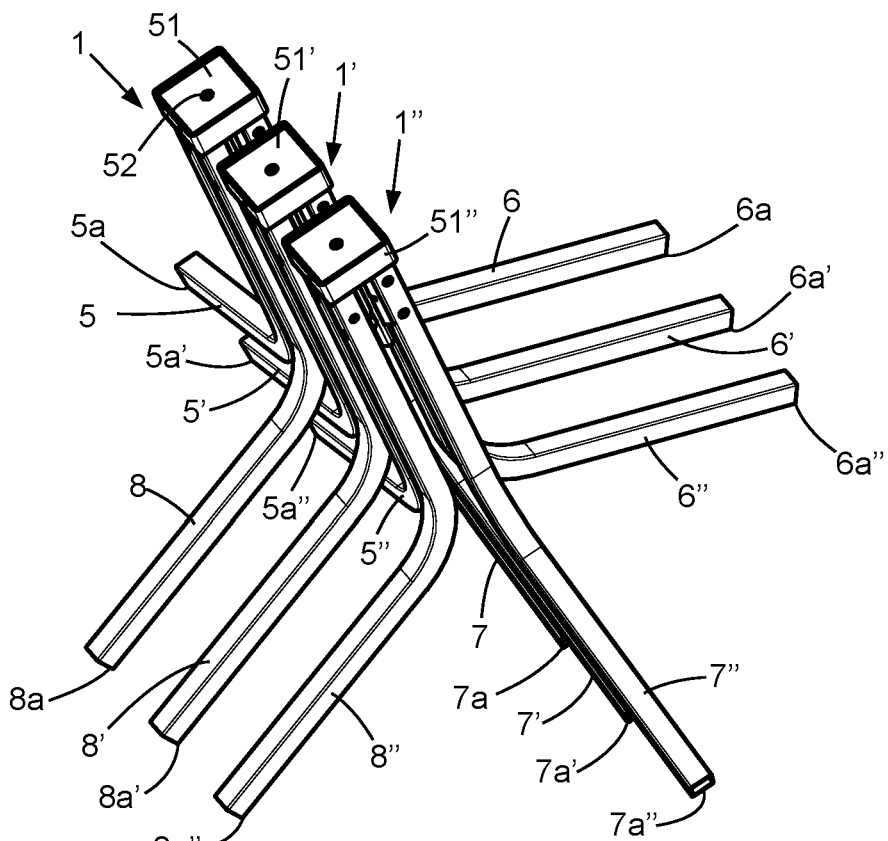
FIG. 8 is a perspective view of a horizontal stack of stabilising arrangements according to the present invention.
Figure 9:
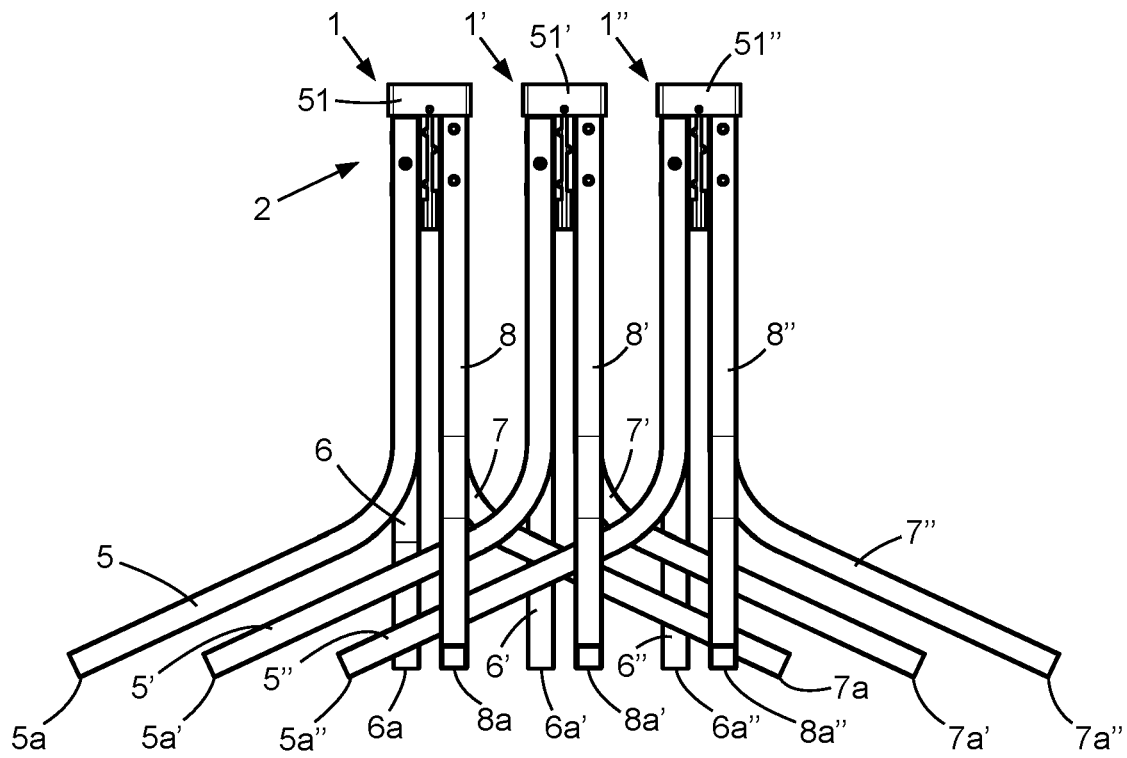
FIG. 9 is a side view of the horizontal stack of stabilising arrangements shown in FIG. 8.

In FIGS. 1 and 4, the two legs in each pair (5 and 7; or 6 and 8) lie in the same plane. However if the two legs in a pair are offset, but still parallel to each other, as discussed in the applicant's international patent application publication number WO201566770, then multiple stabilising arrangements can be horizontally stacked closely together. Such a horizontal stack is shown in FIGS. 8 and 9 where a second stabilising arrangement 1' is stacked between a first stabilising arrangement 1 and a third stabilising arrangement 1". The first leg 5' of the second stabilising arrangement passes under the first leg 5 of the first stabilising arrangement and over the first leg 5" of the third stabilising arrangement. The third leg 7' of the second stabilising arrangement passes over the third leg 7 of the first stabilising arrangement and under the third leg 7" of the third stabilising arrangement. Each leg 5, 6, 7, 8, 5', 6', 7', 8', 5", 6", 7", 8" has a corresponding foot or ground engaging means 5a, 6a, 7a, 8a, 5a', 6a', 7a', 8a', 5a", 6a", 7a", 8a".

In FIGS. 8 and 9 the interconnection means 2 of the stabilising arrangement 1, 1' or 1" includes a respective cap 51, 51', 51". If the bases are to be used to support table tops, but also to stack closely together as shown in FIGS. 8 and 9, then the cap cannot include the spider since the table top must fold into an upright position for stacking and into a horizontal position for use. A hole 52 is provided in the cap for fixing a folding spider mechanism to the stabilising arrangement.

The mechanism used by the stabilising arrangement in FIGS. 8 and 9 is similar to that used in FIG. 1, but with many detail modifications. The top of the stabilising arrangement is shown in FIG. 10 with the cap removed for clarity.

Each leg 5, 6, 7, 8 is now a square profile and the respective slider blocks 31a, 31b, 31c, 31d are fixed to their respective legs towards the inside of the arrangement, with the legs being arranged around the outside of the slider guide 20 of the interconnection means 2. Each slider block 31a, 31b, 31c, 31d also includes a leg end plate 58. The balance beam 32 acts between the leg end plates 58 of the slider blocks 31a, 31b on the first and third legs 5 and 7, pivoting about pivot axis 66 through hole 62 in the balance beam 32. Similarly, the balance beam 34 acts between the leg end plates 58 of the slider blocks 31c, 31d on the second and fourth legs 6 and 8, pivoting about pivot axis 68 through hole 64 in the balance beam 34.

Figure 11:
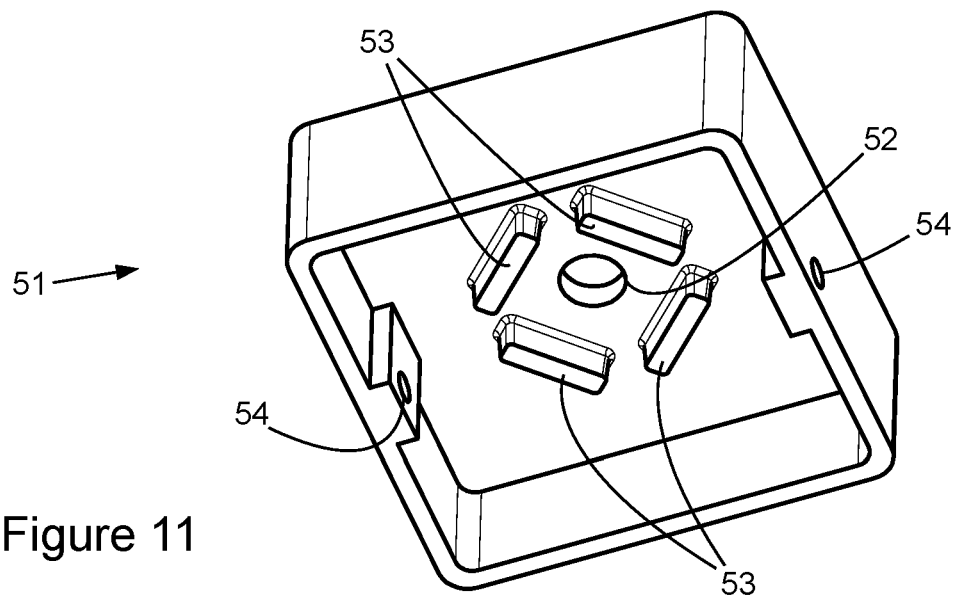
FIG. 11 is a perspective view of a part for one of the stabilising arrangements of FIGS. 8 and 9.

The cap 51, shown in FIG. 11 can be bolted through hole 52 to the slider guide 20. As noted above the same hole 52 can be used to fix a folding top adapter, a spider or object to the stabilising arrangement. Protrusions 53 locate the cap rotationally relative to the slider guide 20. Holes 54 locate the bolts providing the pivot for each balance beam.

Figure 10:
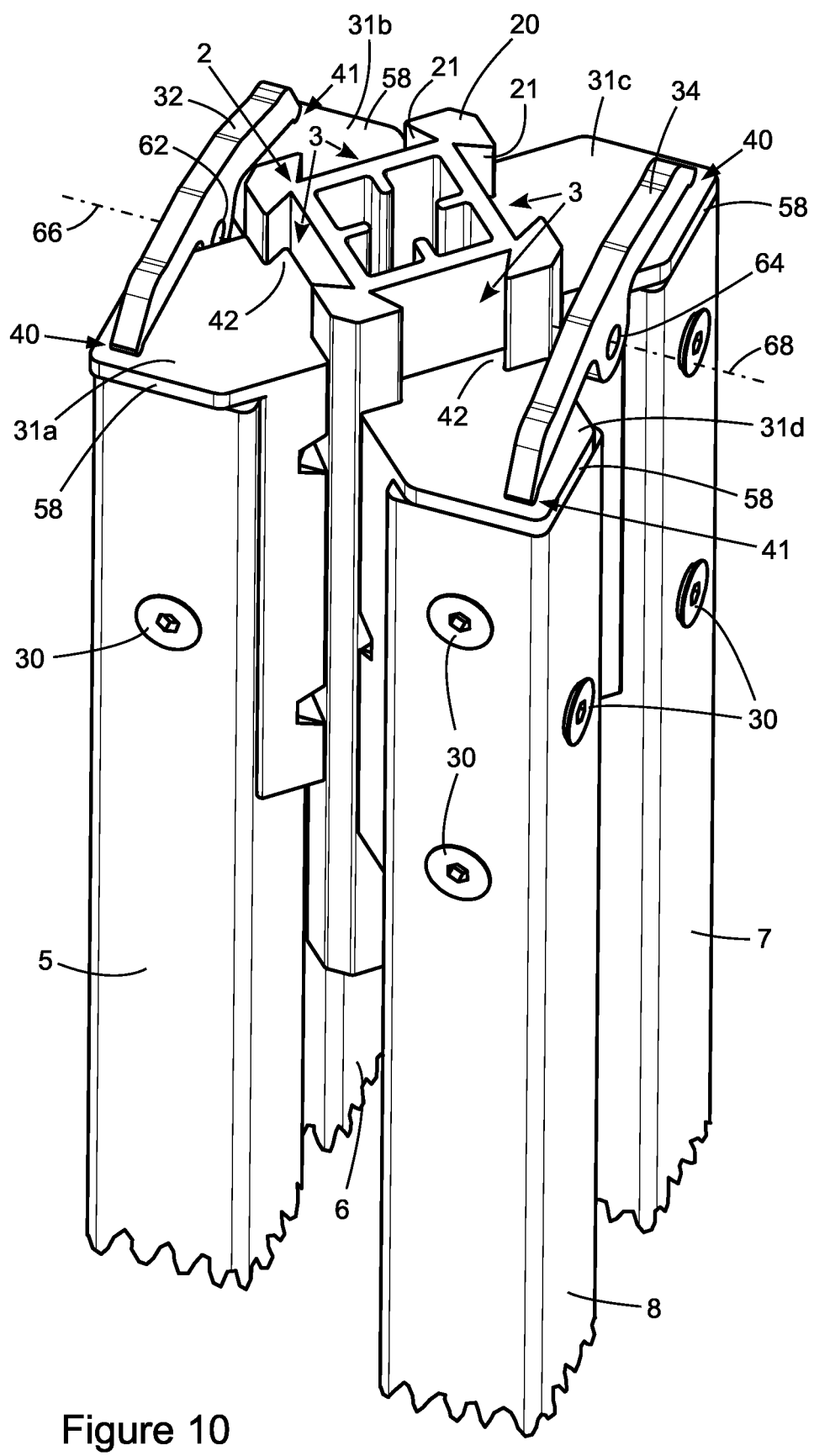
FIG. 10 is perspective view of a detail of one of the stabilising arrangements of FIGS. 8 and 9.
Figure 12:
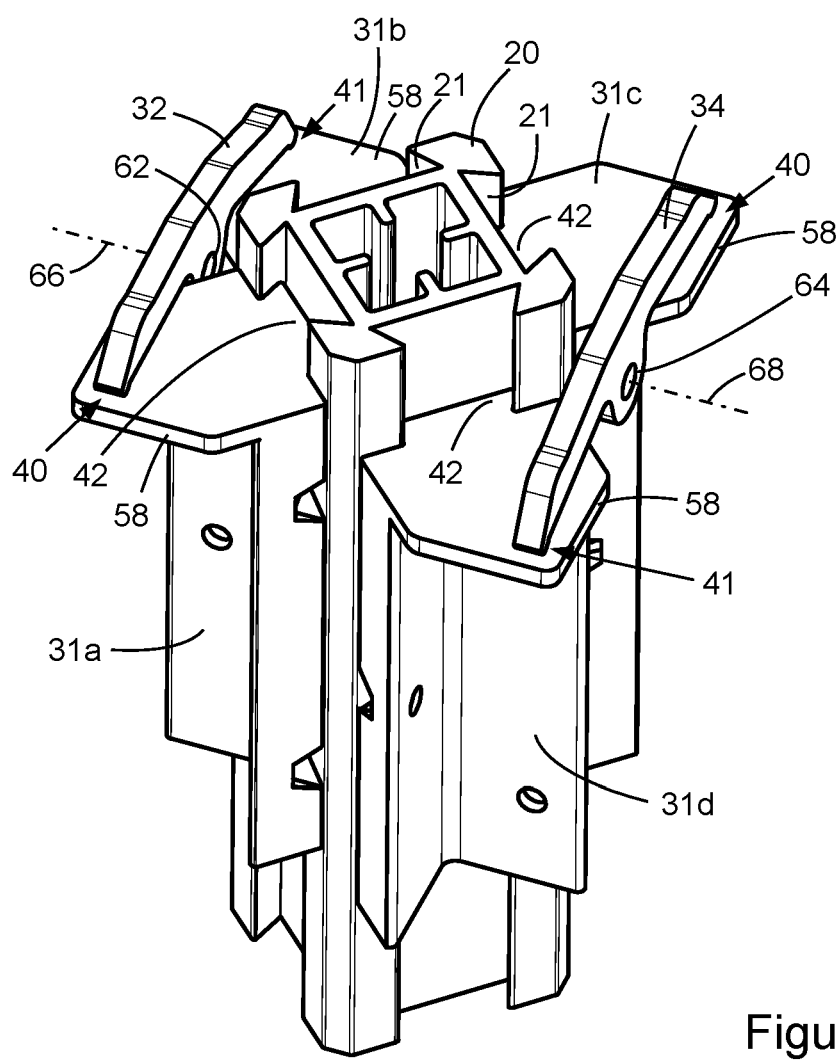
FIG. 12 is a perspective view of some of the parts of the stabilising arrangement shown in FIG. 10.
Figure 13:
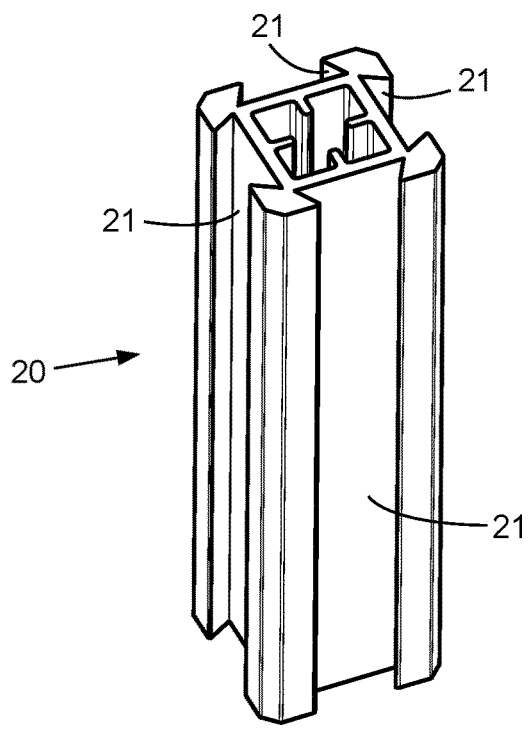
FIG. 13 is a perspective view of a part for the stabilising arrangement of FIG. 10.
Figures 14, 15:
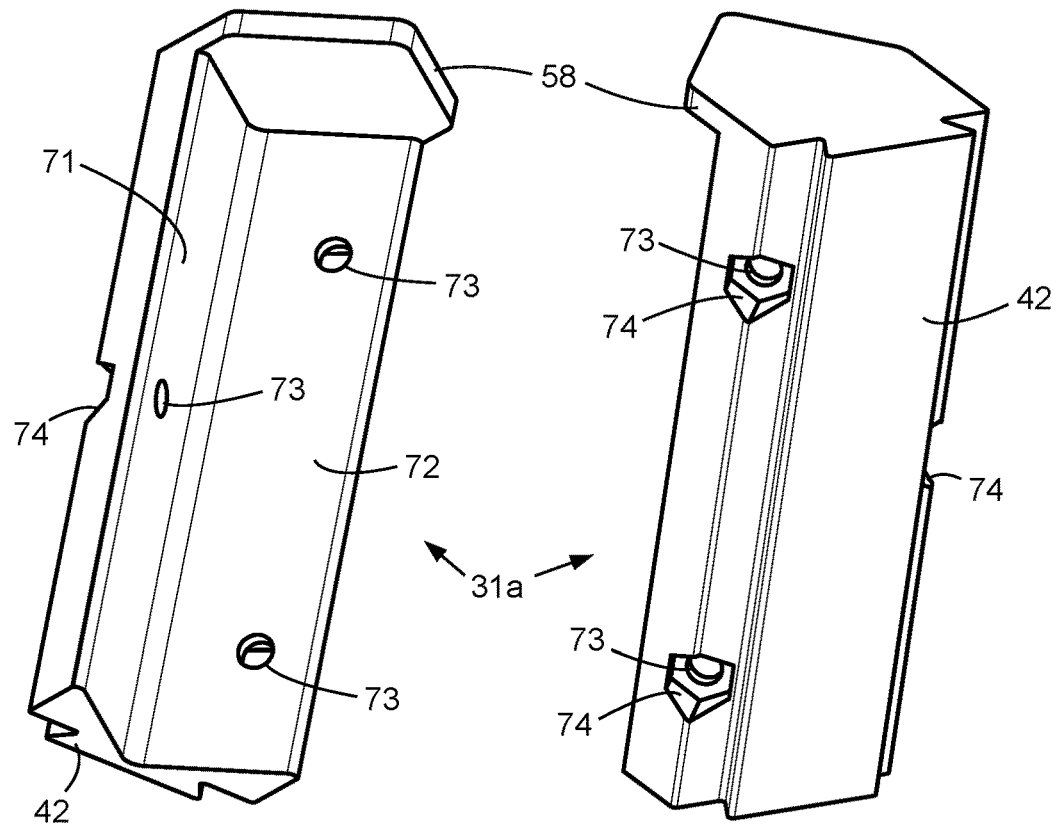
FIG. 14 is a perspective view of a part for the stabilising arrangement of FIG. 10.
FIG. 15 is a perspective view of the part shown in FIG. 14.

FIG. 12 is similar to FIG. 10 but with the legs omitted for clarity. FIG. 13 shows the slider guide of FIGS. 10 and 12. FIGS. 14 and 15 show one of the slider blocks, 31a (each slider block can be identical) from FIGS. 10 and 12 including the integral leg end plate 58 and the flaring out wider portion 42 that is provided to engage with the respective guide slot of the slider guide of the interconnection means. Two side of each square leg are bolted up against the inner surfaces 71 and 72 of the slider block. The bolts holes 73 are provided to accommodate those bolts and the recesses 74 are provided to accommodate and preferably rotationally locate the bolt heads or nuts. For example, in FIG. 10 the bolts 30 are passed through the legs and would pass the through holes 73 of the slider blocks shown in FIGS. 14 and 15 and into nuts rotationally retained within the recesses 74.

Figure 16:
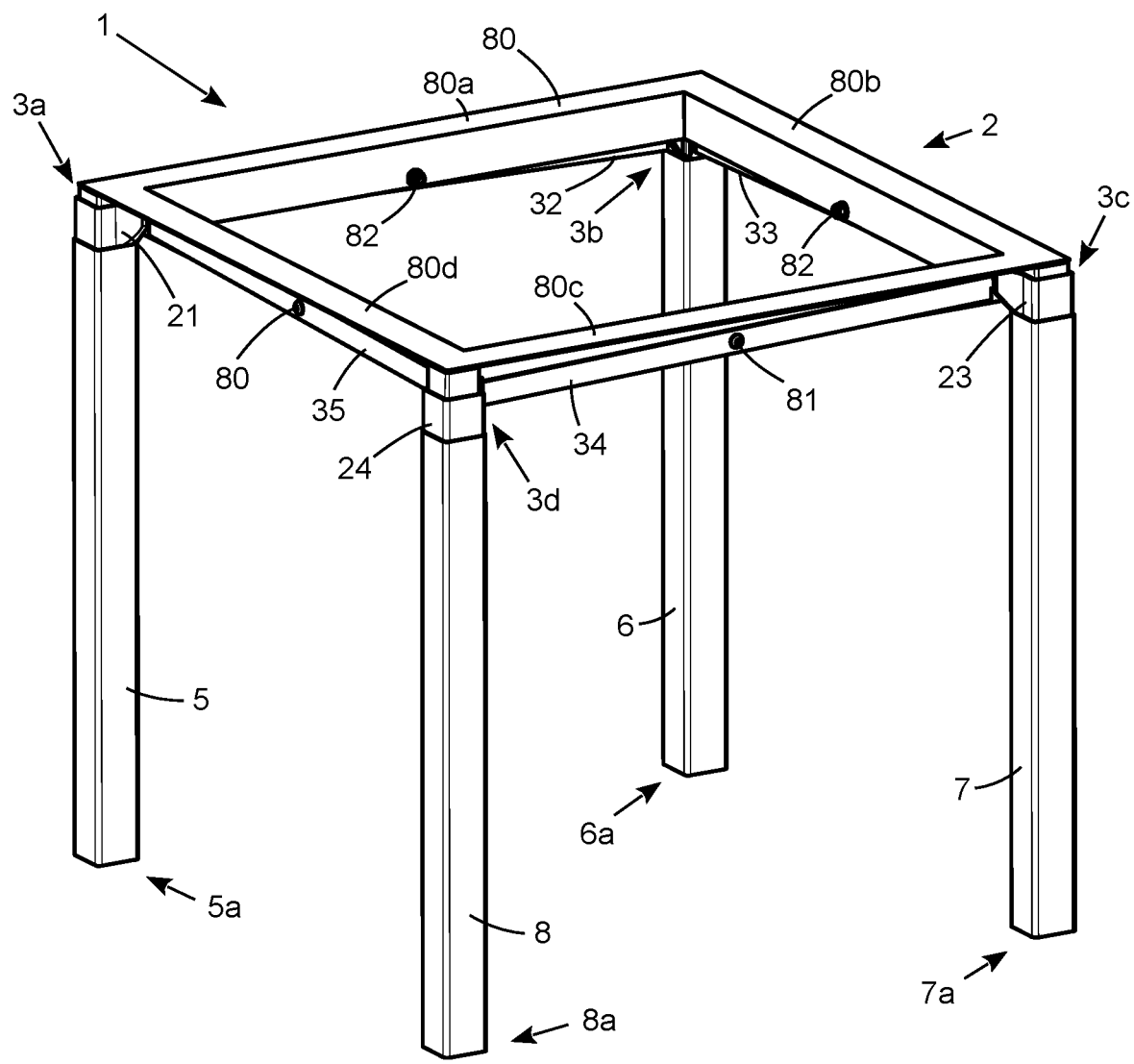
FIG. 16 is a perspective view of a stabilising arrangement according to the present invention.

An alternative arrangement of the present invention is shown in FIG. 16 in an angled view looking from above the level of the top of the stabilising arrangement 1. In this embodiment the legs 5, 6, 7, 8 are shown extending largely up and down at the corners of the interconnection means 2, which itself has a profile from above that is similar to the footprint of the ground engaging means 5a, 6a, 7a, 8a. This is an arrangement typical for a square table for example, having legs that extend from near to corners of the table, although it can be used for other shapes of table top such as round or for supporting other objects. If the object or table top is rectangular or oval, the stabilising arrangement may have a rectangular shape in plan view and other shapes of stabilising arrangement are possible such as parallelogram in plan view.

The interconnection means 2 includes a main body or frame 80 which like the previous slider guide provides interconnection and relative location of the first, second, third and fourth slide connections 3a, 3b, 3c, 3d. The main body or frame 80 shown comprises four sides, each side 80a, 80b, 80c, 80d being formed in this example form an inverted L-section member, the four sides being rigidly connected or formed as a single part. The frame 80 can include additional features not shown such as diagonal cross-braces for increased stiffness if required. First, second, third and fourth balance beams 32, 33, 34, 35 are shown although the only three balance beams are required, so any one of the four balance beams can be omitted to remove a redundant constraint. Each balance beam is pivoted to the frame 80 of the interconnection means 2 by a nut 82 and bolt 81.

Figure 18:
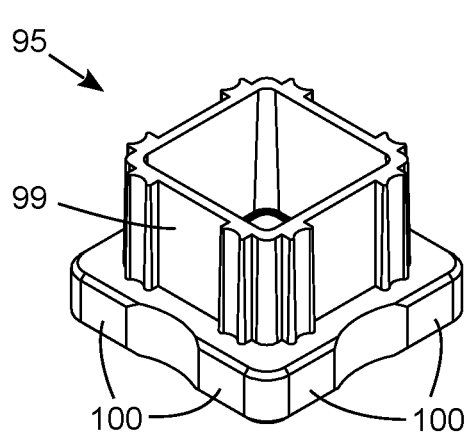
FIG. 18 is a perspective view of a lower guide block for the stabilising arrangement according to a possible embodiment of the present invention.
Figure 17:
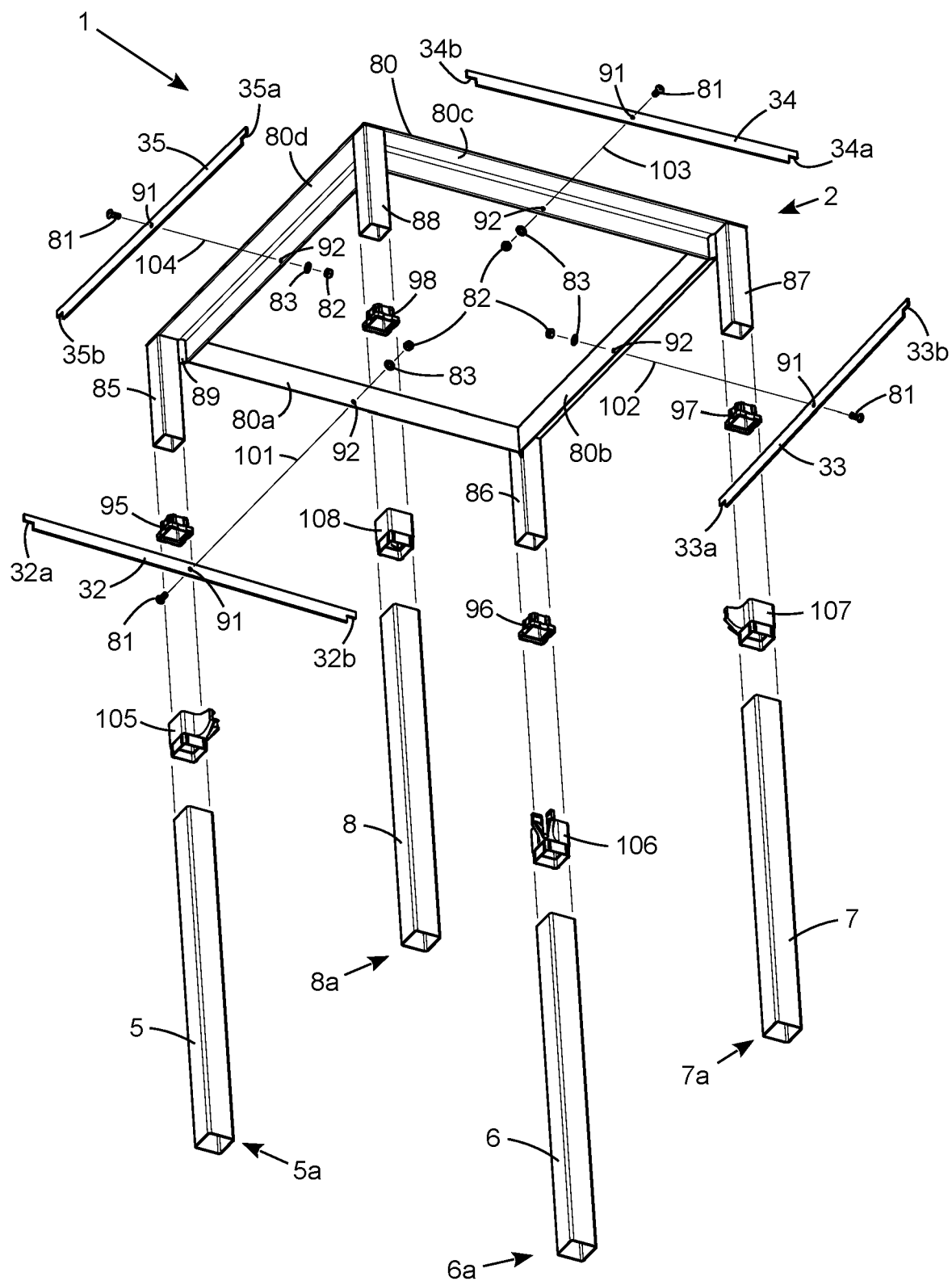
FIG. 17 is a perspective exploded view from under the stabilising arrangement of FIG. 16.

The stabilising arrangement of FIG. 16 is shown in exploded view in FIG. 17, looking from an angle from below the level of the ground engaging means. For clarity, in this embodiment the legs will be referred to as first, second, third or fourth moveable legs 5, 6, 7, 8. A fixed leg portion 85, 86, 87, 88 is integral with, or rigidly connected to the main body 80 of the interconnection means 2. For example, the fixed leg portions 85, 86, 87, 88 can be welded around the top to the main body 3 with a gusset 89 welded between the side of the respective fixed leg portion and the L-shaped members for additional rigidity. A lower guide block 95, 96, 97, 98 is inserted into the bottom of each fixed leg portion. A lower guide block 95 is shown in FIG. 18 and includes an insert portion 99 for inserting into a fixed leg portion and outer guide surfaces 100 that are intended to sit proud of the fixed leg profile. The outer guide surfaces 100 protrude wider than the fixed leg portion when assembled, so that they engage with the inner surfaces of the moveable legs as required to help maintain each moveable leg 5, 6, 7 or 8 substantially in alignment with the respective fixed leg portion 85, 86, 87 or 88.

Referring again to FIG. 17, top caps 105, 106, 107, 108 are inserted into the top of each moveable leg 5, 6, 7, 8. Ideally in assembly, the top caps are slid over the fixed leg portions before the lower guide blocks 95, 96, 97, 98 are inserted into the fixed leg portions, then the moveable legs are pressed over the top caps 105, 106, 107, 108. Each top cap in FIGS. 16 and 17 is a lever connector and includes first and second lever contact regions.

Figure 19:
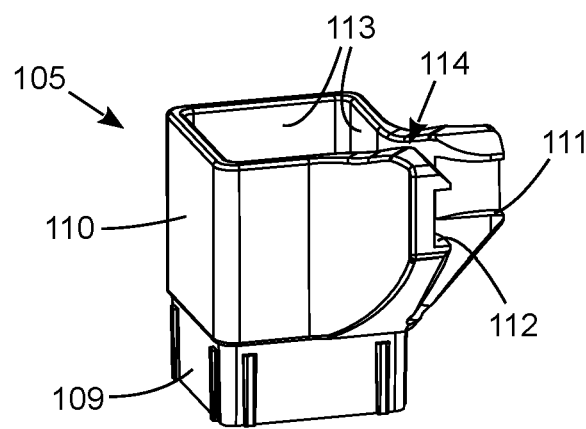
FIG. 19 is a perspective view of a lever connector from the stabilising arrangement of FIG. 16.

FIG. 19 shows a lever connector type top cap 105 comprising an insert portion 109 and a lever connector portion 110. The insert portion 109 is inserted into the top end of the respective moveable leg. Grooves in the lever connector portion 110 provide the first lever contact region 111 and the second lever contact region 112. Inner surfaces of the top cap are guide surfaces 113 which can contact the outer surfaces on the fixed legs as required to help maintain each moveable leg 5, 6, 7 or 8 substantially in alignment with the respective fixed leg portion 85, 86, 87, or 88. The gap 114 in the lever connector portion can be required to clear the strengthening gusset 89, if present.

Referring again to FIG. 17, the four balance beams 32, 33, 34, 35 are each clearly visible, each pivotally connected to the main body or frame 80 of the interconnection means 2, in this example by the bolt 81 passing through a hole 91 in the balance beam and a hole 92 in the interconnection means and being fastened by a nut 82 with a washer 83, although any pivot style can be used. For example, a stub axle (not shown) can be welded to the four sides 80*a*, 80*b*, 80*c*, 80*d* of the interconnection means 2 and the respective balance beam 32, 33, 34, 35 then placed on the stub axle, being axially retained once the lever connector portions of the top caps are assembled over the fixed legs. The pivotal connections of the first, second, third and fourth balance beams 32, 33, 34, 35 have a respective pivot axis 101, 102, 103, 104. Each balance beam has a first end 32*a*, 33*a*, 34*a*, 35*a* and a second end 32*b*, 33*b*, 34*b*, 35*b*.

When assembled and in use, the first end 32*a*, 33*a*, 34*a*, 35*a* of the respective first, second, third or fourth balance beam 32, 33, 34, 35 is engaged with the first lever contact region of the respective top cap 105, 106, 107, 108 of the respective moveable leg 5, 6, 7, 8. Similarly the second end 32*b*, 33*b*, 34*b*, 35*b* of the respective first, second, third or fourth balance beam 32, 33, 34, 35 is engaged with the second lever contact region of the top cap 106, 107, 108, 105 of the second, third, fourth or first moveable leg 6, 7, 8, 5 respectively. Then each pivoted balance beam 32, 33 or 34, 35 effectively interconnects two orthogonally adjacent legs 5 and 6; 6 and 7; 7 and 8; or 8 and 5 via the top caps 105, 106, 107, 108 in this example. Each top cap 105, 106, 107, 108 interconnects two adjacent balance beams 32 and 33; 33 and 34; 34 and 35; or 35 and 32. Such interconnections permit the movable legs or 5, 6, 7, 8 to displace relative to the interconnection means 2 (including the fixed leg portions 85, 86, 87, 88) in a warp mode, i.e. one diagonally opposite pair of legs such as 5 and 7 both move in one direction (for example upwards as shown in FIG. 16) and the other pair of diagonally opposite legs, such as 6 and 8 both move in an opposite direction (example downwards as shown in FIG. 16), so that the ground engaging means 5*a*, 6*a*, 7*a*, 8*a* do not necessarily lie in a common plane, they conform to a warped plane, support surface or ground. Thus the mechanism provided by the interconnected balance beams of the stabilising arrangement can conform to a flat surface or warped ground through the rotation of the balance beams 32, 33, 34, 35 which permit all the ground engaging means of the four movable legs to remain in contact with the ground, regardless of the warp of the ground surface, up to the travel limit of the mechanism or stabilising arrangement.

Loads or forces (typically vertical) input to the ends of each balance beam by the lever contact regions on the movable legs (or in this example, specifically on the top caps 105, 106, 107, 108 of the moveable legs) are reacted by a load or force at the pivot (or pivot axis, or in this example the bolt 81), where the loads or forces on the ends of the balance beam are transmitted to the main body or frame 80 of the interconnection means 2. Thus dissimilar forces between two adjacent movable legs acting on a balance beam cause a rotation of the balance beam until the forces from the two moveable legs into the balance beam are substantially equalised up to the travel limit of the mechanism or stabilising arrangement. The stabilising arrangement has heave, roll and pitch stiffness, but substantially no warp stiffness. That is, if two adjacent moveable legs such as 5 and 6 are moved upwardly and the other two adjacent moveable legs 7 and 8 are moved downwardly, then the balance beams 32 and 34 do not rotate about the pivot axes 101 and 103 relative to the interconnection means 2. Instead the balance beam 32 is urged upwards by the upward displacement of the moveable legs 5 and 6, generating an upward force at the pivot hole 92 in frame member 80*a* and the balance beam 34 is urged downwards by the downward displacement of the movable legs 7 and 8 generating a downward force at the pivot hole 92 in frame member 80*c*, with the result that the interconnection means will follow the average of the ground plane as defined by the four contact or ground engaging points, i.e. ground engaging means 5*a*, 6*a*, 7*a*, 8*a* at the ends of the four moveable legs 5, 6, 7, 8.

Figures 20, 21:
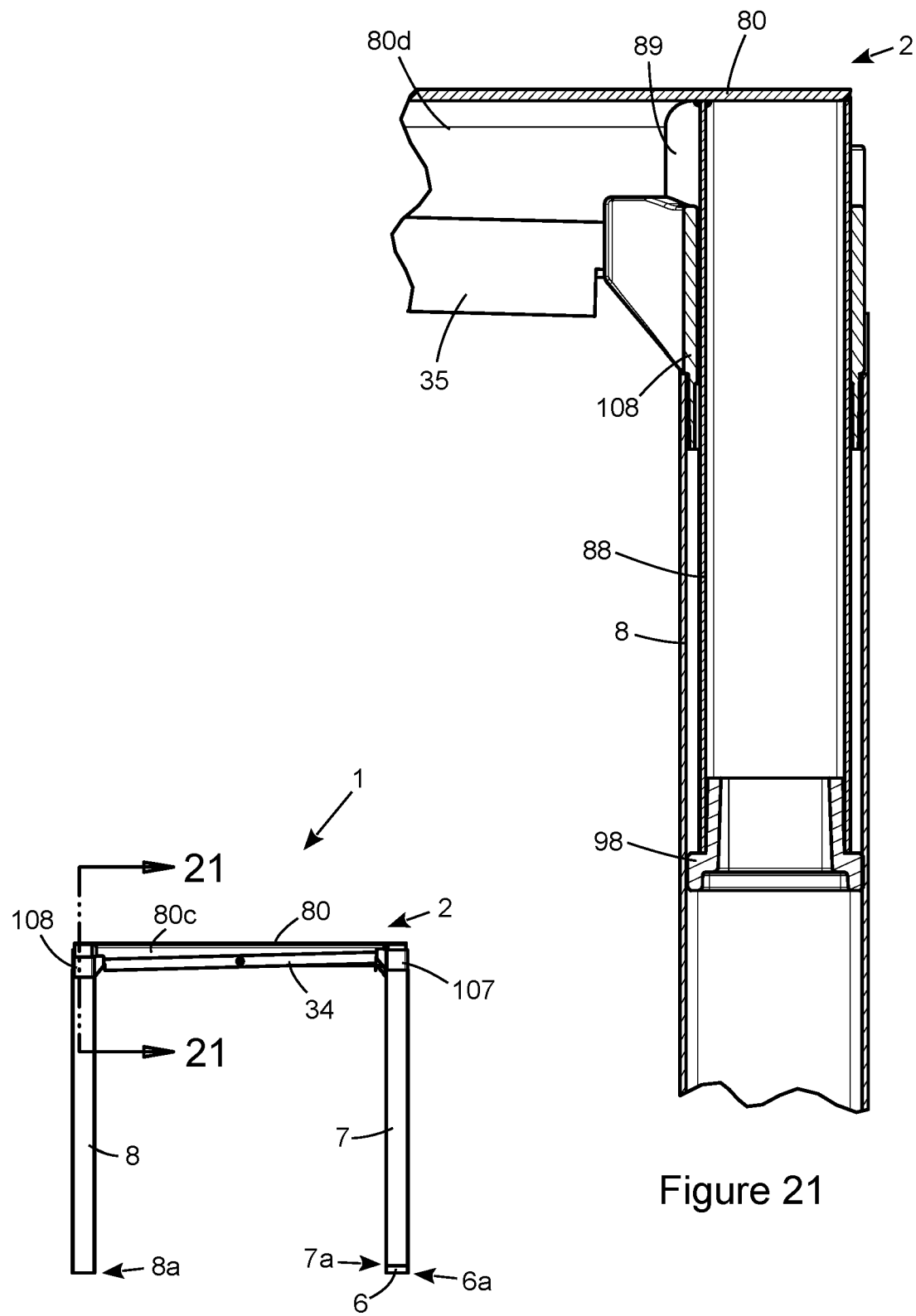
FIG. 20 is a front view of the stabilising arrangement of FIG. 16.
FIG. 21 is a partial section view of the stabilising arrangement of FIGS. 16, 17 and 20, as indicated in FIG. 20.

The stabilising arrangement of FIG. 16 is shown in side view in FIG. 20. As in FIG. 1, the stabilising arrangement in FIG. 20 is shown in an articulated or warped position, that is the first and third movable legs or 5 and 7 are closer to the main body or frame 80 of the interconnection means 2 than the second and fourth moveable legs 6 and 8. Thus in FIG. 20, the lower end or ground engaging means 6*a* of the moveable leg 6 is visible behind, and extending lower than the lower end or ground engaging means 7*a* of the adjacent moveable leg 7.

FIG. 21 shows a section through the upper portion of a corner of the stabilising arrangement 1 as indicated in FIG. 20. The interconnection means 2 includes a fixed leg 88 welded to the main body 80. The lower guide block 98 is inserted into the lower end of the fixed leg portion 88 and around it slides the moveable leg portion 8. The fourth balance beam 35 has its first end engaged in the first lever contact region of the top cap 108 which is itself inserted into the top end of the fourth moveable leg portion 8. Increasing the spacing between the contact or guide surfaces of the lower guide block 98 onto the inner surfaces of the moveable leg portion 8 and the guide surfaces of the top cap 108 onto the outer surfaces of the fixed leg portion 12 is one contributing factor to increasing the alignment of the moveable leg portion to the fixed leg portion. However, the longer the fixed leg portion, the deeper the knocked-down or disassembled form of the stabilising arrangement.

The use of fixed leg portions that are shorter than full height table legs does advantageously permit the stabilising arrangement to be packaged into a much smaller package than a fixed leg base with full length fixed legs. Alternatively, if the interconnection means includes a frame but no permanently fixed or integral table top, for example, the stabilising arrangement can be stacked with other stabilising arrangements for shipping. However, the interconnection means can comprise a table top to which brackets are located to position the pivot points for the beam portions, negating the need for a separate frame. So for some configurations of stabilising arrangement, such as for example when the interconnection means includes an integral table top, the ability to ship the stabilising arrangement in a knocked down form can be beneficial, significantly reducing shipping costs.

Figure 22:
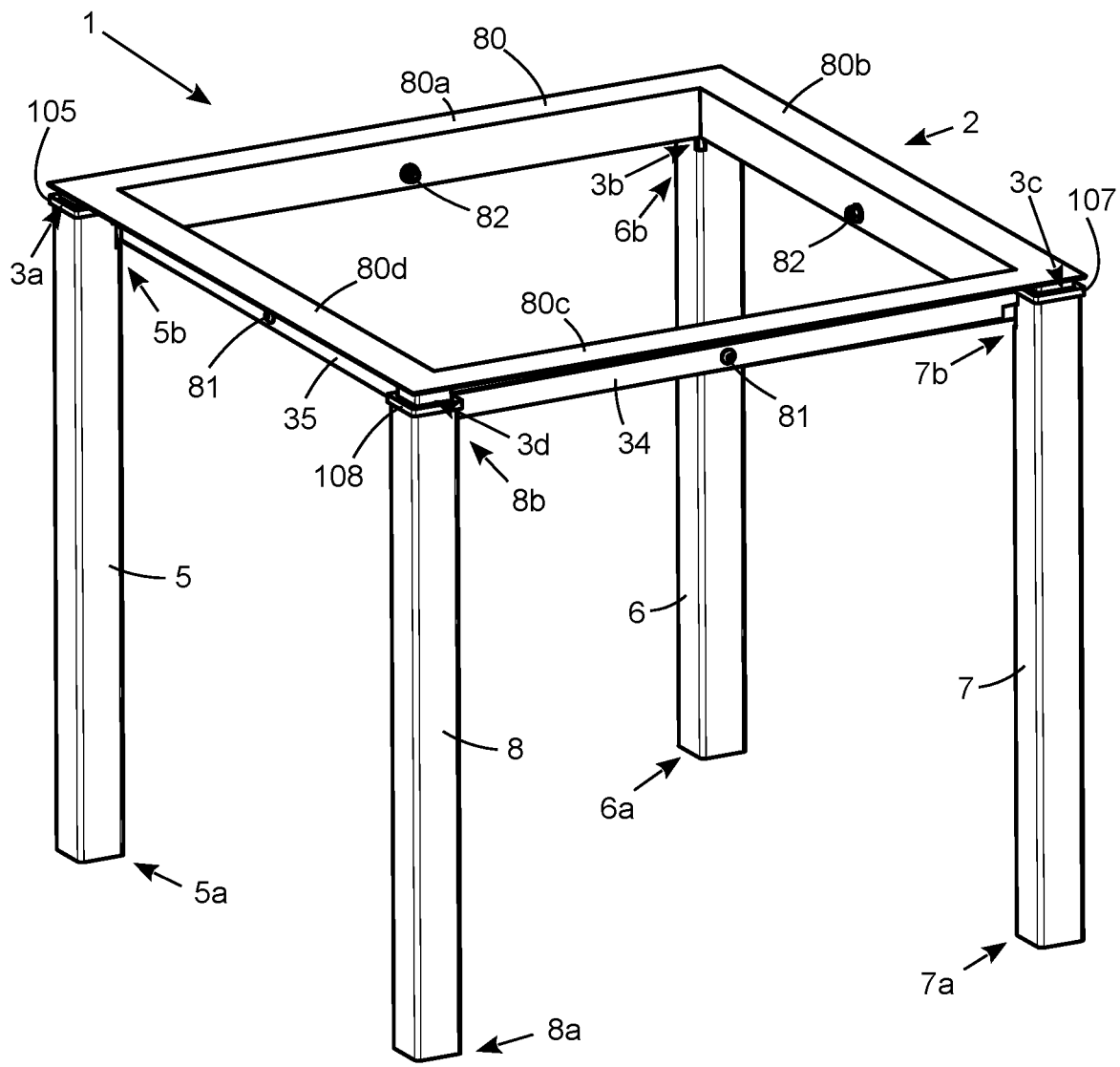
FIG. 22 is a perspective view of a stabilising arrangement according to the present invention.
Figure 23:
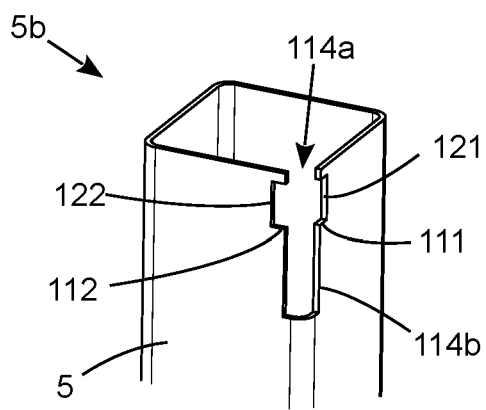
FIG. 23 is a perspective view of the lever contact region end of a moveable leg from the stabilising arrangement of FIG. 22.

FIGS. 22 to 27 show an alternative example of the stabilising arrangement with many similarities to FIGS. 16 to 21, however in this example the top cap 105, 106, 107, 108 no longer includes a lever connector portion. Again top portions 5b, 6b, 7b, 8b of the first, second, third or fourth moveable leg 5, 6, 7 or 8 slide around a corresponding fixed leg 85, 86, 87, 88. However, in this embodiment, the beam portions contact the moveable legs directly, as opposed to via the top caps. As can be seen in FIG. 23, the top portion 5b of the first moveable leg 5 includes a gap 114a which extends into a long slot 114b which can be required to clear a gusset (if provided) or other fixings between the fixed leg 85 and the main body or frame 80. Shorter slots 121 and 122 provide the first and second lever contact regions 111, 112 at which the movable leg 5 transmits the ground reaction forces to the ends 32a and 35b of the balance beams 32 and 35.

Figure 24:
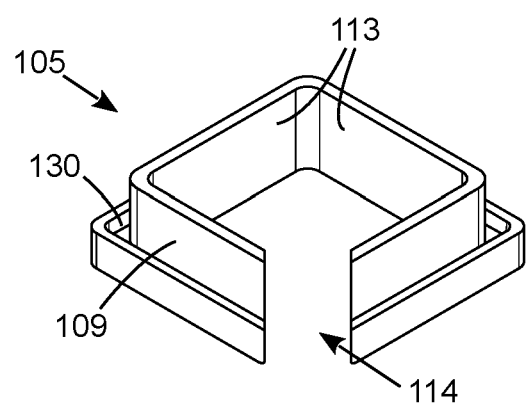
FIG. 24 is a perspective view of an inverted upper guide or top cap for the stabilising arrangement of FIG. 22.

The top cap 105 shown in FIG. 24 does not include lever contact regions as these are provided on the moveable leg. The top cap 105 can still include a gap 114 if required to clear a gusset or other fixing to the frame, if present. The top cap 105 is shown inverted to show the channel 130, provided to receive the wall of the moveable leg. Since the top cap primarily comprises the insert portion 109, the guide surfaces 113 are provided, at least to some extent, on the inside of the insert portion, with the channel 130 preferably being provided to help fix the top cap to the movable leg without distorting the guide surfaces sufficiently to adversely affect the sliding of the movable leg and top cap over the fixed leg.

Figure 25:
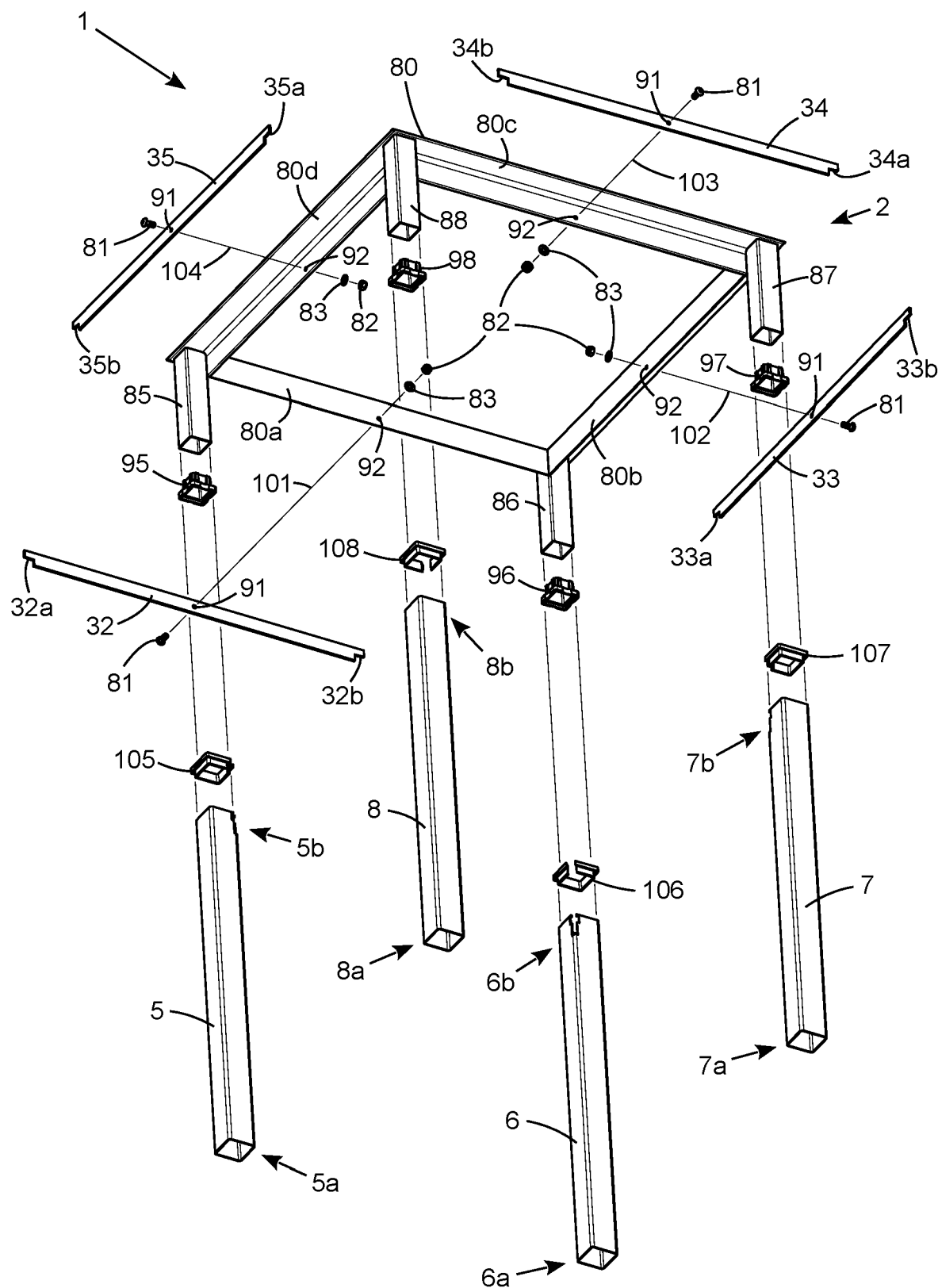
FIG. 25 is a perspective exploded view from under the stabilising arrangement of FIG. 22.

FIG. 25 shows an exploded view of the stabilising arrangement of FIG. 22. The inner corners of the fixed legs 85, 86, 87, 88 are welded (or otherwise fixed or formed) directly to the sections of the beams that form the sides 80a, 80b, 80c, 80d of the main body or frame 80, so the gussets of FIG. 17 are omitted. However the gap 114a in the top portion 5b of the moveable leg 5 in FIG. 23 and the corresponding gap 114 in the top cap in FIG. 24 are both required to clear the main body or frame 80 which now butts up against the inner corner of fixed leg 85 in FIG. 25. The lower guide blocks 95, 96, 97, 98 are similar to those in FIGS. 17, 18 and 21.

Figures 26, 27:
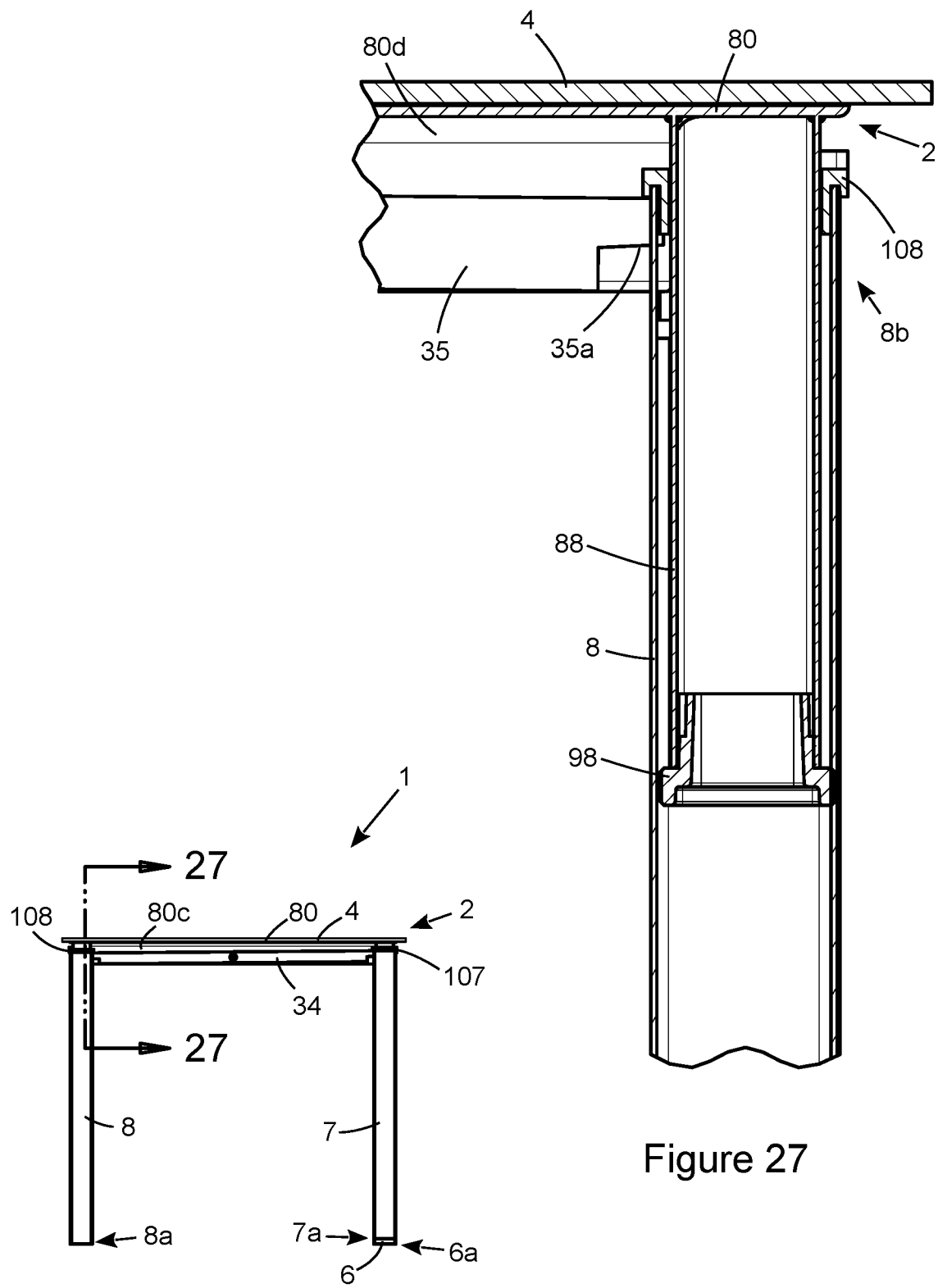
FIG. 26 is a front view of the stabilising arrangement of FIG. 22.
FIG. 27 is a partial section view of the stabilising arrangement of FIGS. 22, 25 and 26, as indicated in FIG. 26.

In FIG. 26 the stabilising arrangement 1 is supporting a table top 4. The stabilising arrangement is again shown articulated, i.e. with the ground engaging regions of the moveable legs defining a warped plane rather than all lying in a common linear plane, so the ground engaging means 6a at the lower end of movable leg 6 is visible behind the movable leg 7 in this side view.

The detailed section in FIG. 27 shows the table top 4 sitting on or fixed to the main body or frame 80 of the interconnection means 2. The top cap 108 can be seen in and on the top portion 8b of the movable leg 8, its guide surfaces providing alignment of the top of the movable leg relative to the fixed leg 88. The lower guide block 98 provides a second alignment region between the fixed leg 88 and the moveable leg 8 spaced apart from the guide surfaces of the top cap 108. The second end 35a of the fourth balance beam 35 can be seen on both sides of the wall of moveable leg 8 as it passes through the slot (not visible) forming the second lever contact region.

Figure 28:
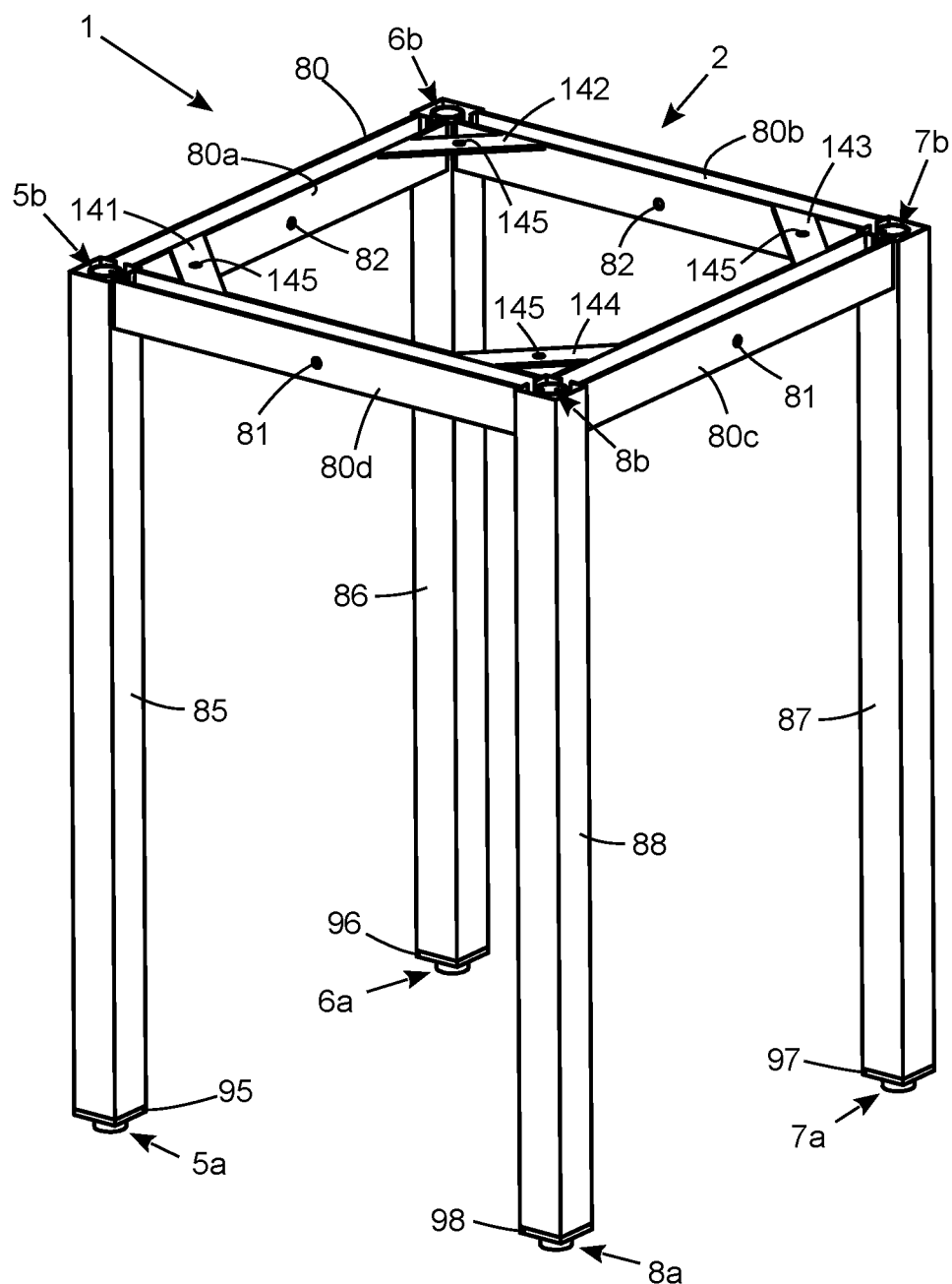
FIG. 28 is a perspective view of a third possible embodiment of a stabilising arrangement according to the present invention.
Figure 29:
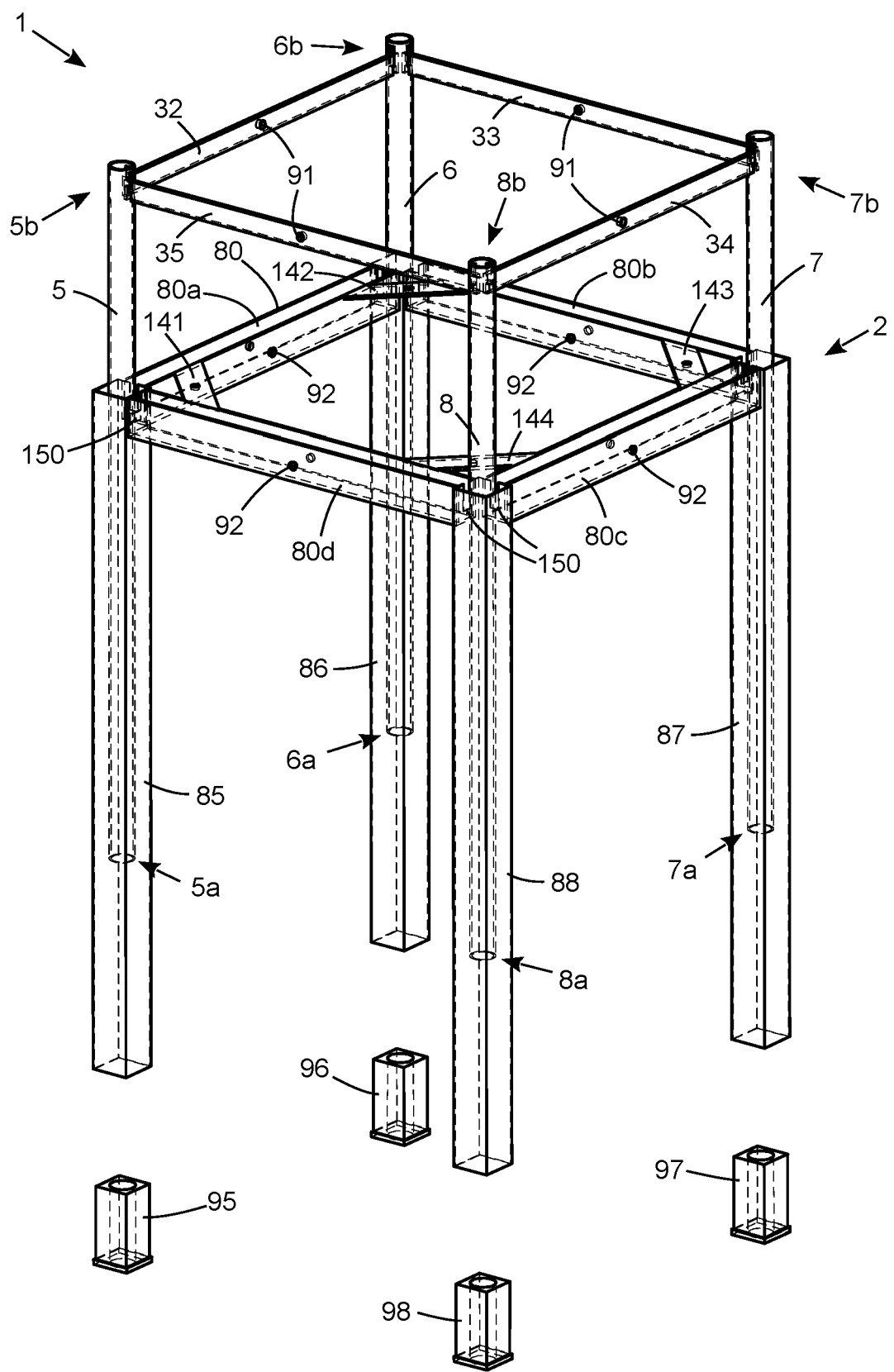
FIG. 29 is a perspective exploded view of the stabilising arrangement of FIG. 28.

FIG. 28 shows a further alternative example of the stabilising arrangement 1 which is also shown in FIG. 29, partially exploded and with hidden lines visible. In this example the main portion of outer leg visible on the stabilising arrangement is the fixed leg portion 85, 86, 87, 88. The interconnection means 2 includes the fixed leg portions which are welded or otherwise fixed to or integral with the sides 80a, 80b, 80c, 80d forming the main body or frame 80 of the interconnection means. These sides 80a, 80b, 80c, 80d are shown as U-shaped section channels although other sections can be used such as L-shaped or T-shaped sections. Ideally the sections are open at the top to allow for the most straightforward assembly of the stabilising arrangement. The U-section illustrated allows for the object being supported, such as a table top or cupboard, to cover the open top of the channel, the inner plate of the U-sections of sides 80a, 80b, 80c, 80d providing an opportunity for reinforcement at the corners as shown by angled bracing plates 141, 142, 143, 144, each having a mounting hole 145 to enable the object being supported to be fixed easily to the stabilising arrangement 1. The lower and outer plates of the U-sections of frame sides 80a, 80b, 80c, 80d hide the mechanism of balance beams within. Any known arrangement can be used to provide the pivotal connection of the balance beams to the U-shaped sides 80a, 80b, 80c, 80d of the interconnection means 2, in this example being bolts 81 providing pivot axes and nuts 82 to retain the bolts. In FIG. 28 only the upper ends 5b, 6b, 7b, 8b and the lower ends or ground engaging means 5a, 6a, 7a, 8a of the moveable legs are visible, with most of the moveable legs being hidden within the fixed legs 85, 86, 87, 88. The lower ends or ground engaging means 5a, 6a, 7a, 8a of the moveable legs are guided by lower guide blocks 95, 96, 97, 98 inserted into the lower ends of the fixed legs.

Figure 30:
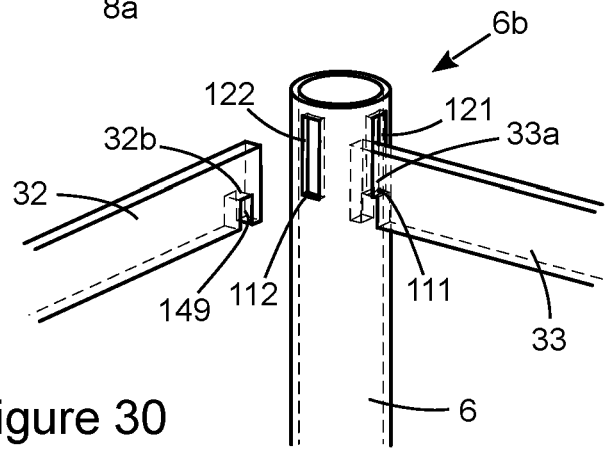
FIG. 30 is a perspective partial exploded view of the stabilising arrangement of FIGS. 28 and 29.

The arrangement can be seen with hidden lines displayed in FIG. 29 in a partially assembled state and FIG. 30 shows the upper end 6b of the second movable leg 6 with the second end 32b of the first balance beam 32 adjacent the second slot 122 in the end of the movable leg. The second end 32b of the first balance beam has a slot 149, as does each end of each balance beam. This slot 149 allows the end of the balance beam to hook over the wall of the moveable leg when passed through the slot, as shown with the second balance beam 33 which has its first end 33a passed through the first slot 121 in the upper end 6b of the moveable leg 6 and the slot 149 in the first end 33a of the balance beam hooked over the wall of the moveable leg 6. As the moveable legs are pivotally connected to the interconnection means 2, hooking the ends of the balance beams into the upper ends of the movable legs provides some location for the upper end of each movable leg in two perpendicular directions in plan view (i.e. two mutually perpendicular lateral directions). This provides sufficient location to ensure that the upper ends 5b, 6b, 7b, 8b of the moveable legs 5, 6, 7, 8 remain approximately central within the fixed legs 85, 86, 87, 88 without the need for additional guide blocks at the upper end. If the top corners of the ends of the balance beams are removed, by chamfering or a radius for example, then the height of each balance beam can be made to ensure that the ends can only be passed into the slots 121, 122 in the moveable legs when the angle between the moveable leg primary axis and the balance beam primary axis is less than ninety degrees, and once the slots 149 in the balance beams are seated over the walls of the moveable legs, they cannot become completely unseated when the balance beams are lifted up and the moveable legs are suspended from the balance beams as shown in FIG. 29.

To assemble the stabilising arrangement, the balance beams 32, 33, 34, 35 are assembled into the upper ends 5*b*, 6*b*, 7*b*, 8*b* of the moveable legs. The balance beam and movable leg subassembly can be lowered into the interconnection means 2 which includes the fixed legs 85, 86, 87, 88 and the U-shaped beams along frame sides 80*a*, 80*b*, 80*c*, 80*d*, this process being partially complete in FIG. 29. The balance beams pass through the open tops of the U-shaped beams and through slots 150 in the upper ends of the fixed legs, inside the U-shaped beams. The slots in the upper ends of the fixed legs can be used as guides to guide the balance beams to limit or substantially prevent bending or rotation in plan view. Guide blocks 95, 96, 97, 98 pressed into the lower ends of the fixed legs 85, 86, 87, 88 locate the lower ends 5*b*, 6*b*, 7*b*, 8*b* of the moveable legs within the fixed legs, these lower ends or ground engaging means of the moveable legs protrude out of the bottom of the fixed legs and guide blocks to contact the ground surface in use. The balance beams are pivotally connected to the interconnection means 2 through holes 92 in the beams of sides 80*a*, 80*b*, 80*c*, 80*d* and holes 91 in the balance beams 32, 33, 34, 35 by bolts (not shown), or pivotally connected in any other known manner. For example a bolt can pass through the holes 92 in the sides 80*a*, 80*b*, 80*c* or 80*d* and through the hole 91 in the balance beam, and through spacer blocks on one or both side of the balance beam between the balance beam and the vertical plates of the U-shaped beams of sides 80*a*, 80*b*, 80*c*, 80*d* to prevent unwanted flexing of the balance in plan view.

Thus the functionality of the five example stabilising arrangements in the drawings (i.e. in FIGS. 1 to 7; 8 to 15; 16 to 21; 22 to 27; and 28 to 30) all provide the same four point support with zero warp stiffness up to the limit of travel.

There are many possible forms of travel limit that can be utilised with the present invention. For example, in FIGS. 1 to 15 the vertical spacing between the first leg fixings and the second leg fixings can be used to generate interference at the desired relative displacement between the two diagonal pairs of legs, i.e. from the first and third legs to the second and fourth legs. The relative motion of the slider blocks 31 in the guide slots 21 can be deliberately limited, for example the guide slots 21 can be blocked by a screw placed after the slider block 31 is assembled in a guide slot 21.

In FIGS. 16 to 27, the travel limit can be provided by the balance beam or top cap contacting the underside of the top plate of one of the sides 80*a*, 80*b*, 80*c*, 80*d* of the main body or frame 80 of the interconnection means 2. In any of the examples described herein, the travel limit can be provided by a pin moving in a limited length slot can be used between the balance beam and the interconnection means, or in FIGS. 16 to 29 between the moveable leg and the fixed leg. In the example in FIGS. 28 and 29, the travel limit can be provided by one of the balance beams contacting one of the lower plates of the U-shaped side members 80*a*, 80*b*, 80*c*, 80*d*, or a balance beam contacting the lower edge of the slot it passes through in the fixed leg, or the movable leg could contact the underside of the object being supported. A ring clamped around a moveable leg (or any other form of step protruding larger than the width of the movable leg) could be positioned to contact the top of the guide block 95, 96, 97 or 98 at the desired travel limit. Similarly feet of larger width than the movable legs can be pressed into the lower end 5*b*, 6*b*, 7*b*, 8*b* of the moveable legs to interfere with the lower surface of the guide blocks as required.

Modifications and variations as would be apparent to a skilled addressee are deemed to be within the scope of the present invention. For example, a respective position of each of the respective legs being determined by at least three of the following constraints:
- a first balance beam 32 pivotally connected directly or indirectly to the interconnection means 2 and engaging in use at a first engaging region 40 with the first leg 5 and engaging in use at a second engaging region 41 with the second leg 6;
- a second balance beam pivotally connected directly or indirectly to the interconnection means 2 and engaging in use at a first engaging region with the second leg 6 and engaging in use at a second engaging region with the third leg 7;
- a third balance beam 34 pivotally connected directly or indirectly to the interconnection means 2 and engaging in use at a first engaging region 40 with the third leg 7 and engaging in use at a second engaging region 41 with the fourth leg 8;
- a first leg fixing to fix the first leg to the third leg; and
- a second leg fixing to fix the second leg to the fourth leg.

Furthermore, a fourth balance beam can be used, but would provide redundancy.

Preferably, a first balance beam is pivotally connected directly or indirectly to the interconnection means at a first pivot and engaging in use, directly or indirectly with the first leg and engaging in use directly or indirectly with the second leg, with the respective position of each of the respective four legs being determined by one each of at least two of the following additional constraints:
  i. a second balance beam pivotally connected directly or indirectly to the interconnection means at a second pivot and engaging in use, directly or indirectly with the second leg and engaging in use directly or indirectly with the third leg;
  ii. a third balance beam pivotally connected directly or indirectly to the interconnection means at a third pivot and engaging in use, directly or indirectly with the third leg and engaging in use directly or indirectly with the fourth leg;
  iii. a first leg fixing providing a fixing of the first leg to the third leg; and
  iv. a second leg fixing providing a fixing of the second leg to the fourth leg.

More preferably, the at least two additional constraints include one of the following combinations:
  the second balance beam and the third balance beam;
  the second balance beam and the second leg fixing;
  the third balance beam and the first leg fixing; or
  the first leg fixing and the second leg fixing.

The object being supported can be as varied as a table top, a cupboard, a fish tank or an audio speaker for example.

The invention claimed is:

1. A stabilizing arrangement for supporting an object, the stabilizing arrangement including:
   an interconnection means for connecting to at least one leg and for pivotally connecting to at least one balance beam,
   a first leg, a second leg, a third leg and a fourth leg, each of the first, second, third and fourth legs being slidably connected to the interconnection means by a respective slide connection, and each having a respective ground engaging means for engaging a ground, the respective ground engaging means of the second and fourth legs being on opposing sides of a virtual straight line extending between the respective ground engaging means of the first and third legs, wherein said at least one balance beam includes a first balance beam pivotally connected directly or indirectly to the interconnection means at a first pivot, the first balance beam, in use, contacting and directly acting on but not being fixed to a lever contact region on the first leg, and in use, contacting and directly acting on but not being fixed to a lever contact region on the second leg;

wherein a respective position of each of the respective legs is determined by at least three different constraints including the first balance beam and at least two of the following additional constraints:

i. a second balance beam pivotally connected directly or indirectly to the interconnection means at a second pivot, and in use, directly acting on but not being fixed to a lever contact region on the second leg, and in use, directly acting on but not being fixed to a lever contact region on the third leg;

ii. a third balance beam pivotally connected directly or indirectly to the interconnection means at a third pivot and in use, directly acting on but not being fixed to a lever contact region on the third leg and in use, directly acting on but not being fixed to a lever contact region on the fourth leg;

iii. a first leg fixing providing a fixing of the first leg to the third leg; and iv. a second leg fixing providing a fixing of the second leg to the fourth leg, said at least three different constraints thereby ensuring that the first leg moves in a first direction relative to the interconnection means when the second leg moves in at least a second direction relative to the interconnection means, the second direction being an opposite direction relative to the first direction, and the third leg moves in the first direction and the fourth leg moves in at least the second direction.

2. The stabilizing arrangement as claimed in claim 1 wherein the at least two additional constraints include one of the following combinations of the constraints:

a) constraint i. the second balance beam pivotally connected to the interconnection means and engaging with lever contact regions on the second and third legs and constraint ii. the third balance beam pivotally connected to the interconnection means and engaging with lever contact regions on the third and fourth legs;

b) constraint i. the second balance beam pivotally connected to the interconnection means and engaging with lever contact regions on the second and third legs and constraint iv. the second leg fixing which fixes the second leg to the fourth leg;

c) constraint ii. the third balance beam pivotally connected to the interconnection means and engaging with lever contact regions on the third and fourth legs and constraint iii. the first leg fixing which fixes the first leg to the third leg; or d) constraint iii. the first leg fixing which fixes the first leg to the third leg and constraint iv. the second leg fixing which fixes the second leg to the fourth leg.

3. The stabilizing arrangement as claimed in claim 1 wherein the object is supported by or connected directly or indirectly to the interconnection means.

4. The stabilizing arrangement as claimed in claim 1 wherein the object is a table top.

5. The stabilizing arrangement as claimed in claim 1 further including an additional constraint of a fourth balance beam pivotally connected directly or indirectly to the interconnection means at a fourth pivot and engaging in use directly with a lever contact region on the fourth leg and engaging in use with the first leg.

6. The stabilizing arrangement as claimed in claim 1 wherein each said slide connection permits linear sliding of the respective leg relative to the interconnection means.

7. The stabilizing arrangement as claimed in claim 6 wherein the linear sliding of the respective leg is in a substantially vertical direction relative to the interconnection means or in a direction that is perpendicular to an average ground plane.

8. The stabilizing arrangement as claimed in claim 1 wherein the first balance beam engages in use at a first engagement region with said or one of said lever contact regions on the first leg and engages in use at a second engagement region with said or one of said lever contact regions on the second leg, the first engagement region being on the opposite side of the first pivot to the second engagement region.

9. The stabilizing arrangement as claimed in claim 1 wherein the additional constraints include the second balance beam, the second balance beam engages in use at a first engagement region with said or one of said lever contact regions on the second leg and engages in use at a second engagement region with said or one of said lever contact regions on the third leg, the first engagement region being on the opposite side of the second pivot to the second engagement region.

10. The stabilizing arrangement as claimed in claim 1 wherein the additional constraints include the third balance beam, the third balance beam engages in use at a first engagement region with said or one of said lever contact regions on the third leg and engages in use at a second engagement region with said or one of said lever contact regions on the fourth leg, the first engagement region being on the opposite side of the first and/or third pivot to the second engagement region.

11. A stabilizing arrangement for supporting an object, the stabilizing arrangement including:

an interconnection means for connecting to at least one leg and for pivotally connecting to at least one balance beam, a first leg, a second leg, a third leg and a fourth leg, each of the first, second, third and fourth legs being slidably connected to the interconnection means by a respective slide connection, and each having a respective ground engaging means for engaging a ground, the respective ground engaging means of the second and fourth legs being on opposing sides of a virtual straight line extending between the respective ground engaging means of the first and third legs, wherein said at least one balance beam includes a first balance beam pivotally connected directly or indirectly to the interconnection means at a first pivot, the first balance beam, in use, directly acting on but not being fixed to a lever contact region on the first leg and in use, directly acting on but not being fixed to a lever contact region on the second leg;

wherein a respective position of each of the respective legs is determined by at least three different constraints including the first balance beam and at least two of the following additional constraints:

i. a second balance beam pivotally connected directly or indirectly to the interconnection means at a second pivot, and in use, directly acting on but not being fixed to a lever contact region on the second leg and in use, directly acting on but not being fixed to a lever contact region on the third leg;

ii. a third balance beam pivotally connected directly or indirectly to the interconnection means at a third pivot and in use, directly acting on but not being fixed to a lever contact region on the third leg and in use, directly acting on but not being fixed to a lever contact region on the fourth leg;

iii. a first leg fixing providing a fixing of the first leg to the third leg; and iv. a second leg fixing providing a fixing of the second leg to the fourth leg, said at least three different constraints thereby ensuring that the first leg moves in a first direction relative to the interconnection means when the second leg moves in at least a second direction relative to the interconnection means, the second direction being an opposite direction relative to the first direction, and the third leg moves in the first direction and the fourth leg moves in at least the second direction wherein, the additional constraints include the first leg fixing, the first leg being fixed to the third leg by a first lower brace, the first leg fixing including the first lower brace.

12. The stabilizing arrangement as claimed in claim 11 wherein the first leg is further fixed to the third leg by a first upper brace or an upper extension to the first lower brace, the first leg fixing including the first upper brace or the upper extension to the first lower brace.

13. The stabilizing stabilising arrangement as claimed in claim 12 wherein, the additional constraints further include the second leg fixing, the second leg is fixed to the fourth leg by a second lower brace, the second leg fixing including the second lower brace.

14. The stabilizing arrangement as claimed in claim 13 wherein the second leg is further fixed to the fourth leg by a second upper brace, the second leg fixing including the second lower brace, at least one of the first or second upper or lower braces being removable.

15. A stabilizing arrangement for supporting an object, the stabilizing arrangement including:

an interconnection means for connecting to at least one leg and for pivotally connecting to at least one balance beam, a first leg, a second leg, a third leg and a fourth leg, each of the first, second, third and fourth legs being slidably connected to the interconnection means by a respective slide connection, and each having a respective ground engaging means for engaging a ground, the respective ground engaging means of the second and fourth legs being on opposing sides of a virtual straight line extending between the respective ground engaging means of the first and third legs, wherein said at least one balance beam includes a first balance beam pivotally connected directly or indirectly to the interconnection means at a first pivot, the first balance beam, in use, directly acting on but not being fixed to a lever contact region on the first leg and in use, directly acting on but not being fixed to a lever contact region on the second leg;

wherein a respective position of each of the respective legs is determined by at least three different constraints including the first balance beam and at least two of the following additional constraints:

i. a second balance beam pivotally connected directly or indirectly to the interconnection means at a second pivot and in use, directly acting on but not being fixed to a lever contact region on the second leg and in use, directly acting on but not being fixed to a lever contact region on the third leg;

ii. a third balance beam pivotally connected directly or indirectly to the interconnection means at a third pivot and in use, directly acting on but not being fixed to a lever contact region on the third leg and in use, directly acting on but not being fixed to a lever contact region on the fourth leg;

iii. a first leg fixing providing a fixing of the first leg to the third leg; and iv. a second leg fixing providing a fixing of the second leg to the fourth leg, said at least three different constraints thereby ensuring that the first leg moves in a first direction relative to the interconnection means when the second leg moves in at least a second direction relative to the interconnection means, the second direction being an opposite direction relative to the first direction, and the third leg moves in the first direction and the fourth leg moves in at least the second direction wherein, the additional constraints include the second leg fixing, the second leg being fixed to the fourth leg by a second lower brace, the second leg fixing including the second lower brace.

16. The stabilizing arrangement as claimed in claim 15 wherein the second leg is further fixed to the fourth leg by a second upper brace or by an upper extension to the second lower brace.

17. The stabilizing arrangement as claimed in claim 1 wherein when the at least two additional constraints include said constraint i. the second balance beam pivotally connected to the interconnection means and engaging with said or one of said lever contact regions on each of the second and third legs and said constraint ii. the third balance beam pivotally connected to the interconnection means and engaging with said or one of said lever contact regions on each of the third and fourth legs, each of the respective first, second, third and fourth legs is a respective movable leg including the respective ground engaging means, the interconnection means includes first, second, third and fourth fixed leg portions, and each said respective slide connection permits the respective movable leg to slide relative to the respective fixed leg portion of the interconnection means.

18. The stabilizing arrangement as claimed in claim 17 wherein said at least one lever contact region on each said movable leg further includes first and second lever contact regions, each balance beam including a first engagement region and a second engagement region, the respective first, second or third pivot being between the first and second engagement regions of the respective first, second or third balance beam, the first engagement region of the first balance beam being, in use, in contact with the first lever contact region of the first movable leg, the first engagement region of the second balance beam being, in use, in contact with the first lever contact region of the second moveable leg, the first engagement region of the third balance beam being, in use, in contact with the first lever contact region of the third moveable leg, the second engagement region of the first balance beam being, in use, in contact with the second lever contact region of the second movable leg, the second engagement region of the second balance beam being, in use, in contact with the second lever contact region of the third moveable leg, the second engagement region of the third balance beam being, in use, in contact with the second lever contact region of the fourth moveable leg.

19. The stabilizing arrangement as claimed in claim 18 further including an additional constraint of a fourth balance beam having first and second engagement regions and being pivotally connected directly or indirectly to the interconnection means at a fourth pivot between the first and second engagement regions, the first engagement region of the fourth balance beam, in use, being in contact with but not fixed to the first lever contact region of the fourth movable leg and the second engagement region of the fourth balance beam, in use, being in contact with but not fixed to the second lever contact region of the first movable leg, and wherein each of the respective first, second, third or fourth pivots has a respective pivot axis, the first pivot axis being substantially aligned with the third pivot axis and the second pivot axis being substantially aligned with the fourth pivot axis.

20. The stabilizing arrangement as claimed in claim 17 wherein the respective movable leg is substantially located around the outside of the respective fixed leg portion or wherein the respective moveable leg is located substantially inside the respective fixed leg portion.

* * * * *